US012687397B2

(12) United States Patent
Johnson et al.

(10) Patent No.: US 12,687,397 B2
(45) Date of Patent: Jul. 21, 2026

(54) ASSISTED NAVIGATION SYSTEMS AND METHODS

(71) Applicant: Raymarine UK Limited, Fareham (GB)

(72) Inventors: Mark Johnson, Vannes Cedex (FR); Mark C. Rivers, Winchester (GB); Weronika Nowicka, Fareham (GB)

(73) Assignee: Raymarine UK Limited, Fareham (GB)

( * ) Notice: Subject to any disclaimer, the term of this patent is extended or adjusted under 35 U.S.C. 154(b) by 84 days.

(21) Appl. No.: 18/634,806

(22) Filed: Apr. 12, 2024

(65) Prior Publication Data

US 2024/0271943 A1    Aug. 15, 2024

Related U.S. Application Data

(63) Continuation of application No. PCT/US2022/046437, filed on Oct. 12, 2022.

(60) Provisional application No. 63/255,935, filed on Oct. 14, 2021.

(51) Int. Cl.
*G01C 21/20* (2006.01)
*G01C 21/00* (2006.01)
*G08G 3/02* (2006.01)

(52) U.S. Cl.
CPC ......... *G01C 21/20* (2013.01); *G01C 21/3807* (2020.08); *G01C 21/3841* (2020.08); *G08G 3/02* (2013.01)

(58) Field of Classification Search
CPC ........................... G01C 21/20; G01C 21/3807; G01C 21/3841; G01C 21/005; G08G 3/02
See application file for complete search history.

(56) References Cited

U.S. PATENT DOCUMENTS

| | | |
|---|---|---|
| 6,750,815 B2 | 6/2004 | Michaelson et al. |
| 7,589,646 B2 | 9/2009 | Glover |
| 10,037,701 B2 | 7/2018 | Harnett |
| 10,431,099 B2 | 10/2019 | Stewart et al. |

(Continued)

FOREIGN PATENT DOCUMENTS

| | | | | |
|---|---|---|---|---|
| GB | 2505121 A | * | 2/2014 | ............. B63B 43/18 |
| RU | 2647199 C1 | * | 3/2018 | ............. G01S 15/89 |
| WO | WO 2014149841 A1 | | 9/2014 | |

*Primary Examiner* — Rachid Bendidi
*Assistant Examiner* — Kirsten Jade M Santos
(74) *Attorney, Agent, or Firm* — Haynes and Boone, LLP

(57) ABSTRACT

Techniques are disclosed for systems and methods to provide assisted navigation based on surrounding threats. In one example, an assisted navigation system receives data from a plurality of sensors associated with a mobile structure. The assisted navigation system determines a plurality of navigational hazards disposed within a monitored area associated with the mobile structure. The assisted navigation system processes the data and/or the navigational hazards to determine an operational context of the mobile structure. The assisted navigation system generates a context-dependent navigational chart for the mobile structure, wherein the navigational chart comprises greater or fewer of the navigational hazards in response to the determined operational context. The assisted navigation system updates the navigational chart in response to changes in the data. Additional systems and methods are provided.

20 Claims, 31 Drawing Sheets

(56)       References Cited

U.S. PATENT DOCUMENTS

| 10,942,028 | B2 | 3/2021 | Johnson et al. |
| 2016/0049075 | A1 | 2/2016 | Sato et al. |
| 2018/0259339 | A1* | 9/2018 | Mark ..................... B63B 49/00 |
| 2020/0105143 | A1 | 4/2020 | Ramstrum, Jr. |

* cited by examiner

Solent Searoom in meters based on depth soundings alone

1100

Solent Searoom in meters Based on depth soundings alone

1200

1300

Solent Searoom in meters based on both navigation marks and soundings

1600

1700

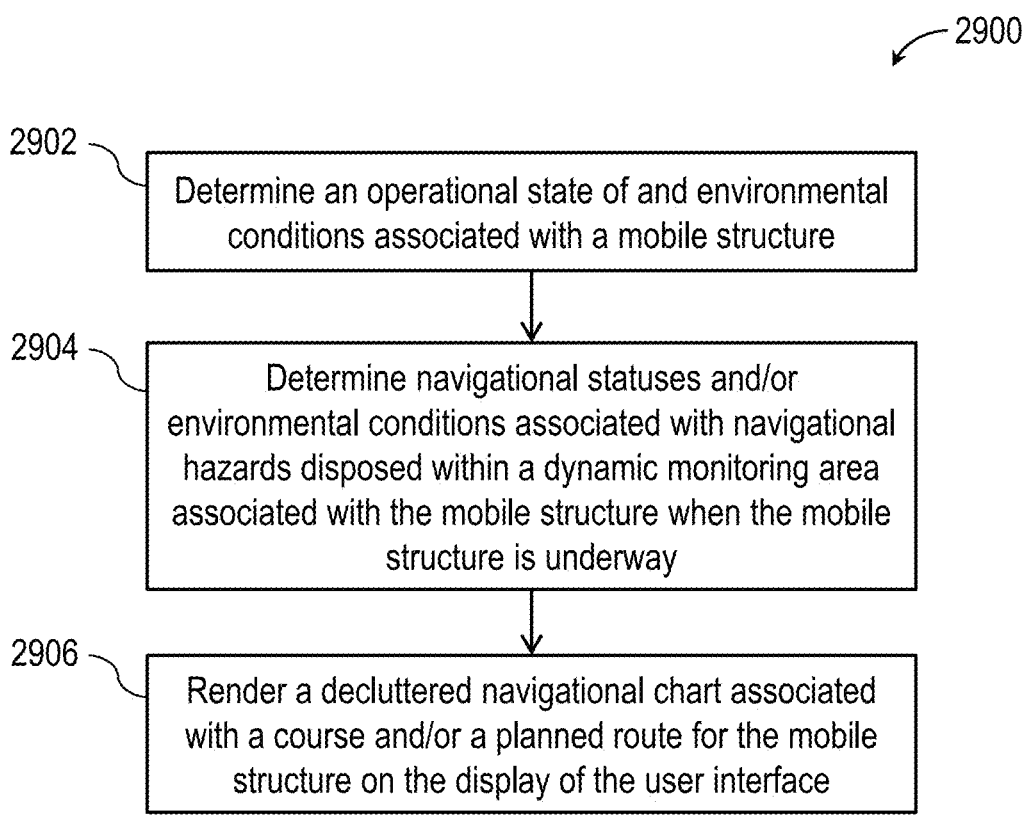

2900

2902 — Determine an operational state of and environmental conditions associated with a mobile structure 2904 — Determine navigational statuses and/or environmental conditions associated with navigational hazards disposed within a dynamic monitoring area associated with the mobile structure when the mobile structure is underway 2906 — Render a decluttered navigational chart associated with a course and/or a planned route for the mobile structure on the display of the user interface

FIG. 29

ASSISTED NAVIGATION SYSTEMS AND METHODS

CROSS-REFERENCE TO RELATED APPLICATIONS

This application is a continuation of International Patent Application No. PCT/US2022/046437 filed Oct. 12, 2022 and entitled "ASSISTED NAVIGATION SYSTEMS AND METHODS," which claims priority to and the benefit of U.S. Provisional Patent Application No. 63/255,935 filed Oct. 14, 2021 and entitled "ASSISTED NAVIGATION SYSTEMS AND METHODS," all of which are incorporated herein by reference in their entirety.

TECHNICAL FIELD

One or more embodiments of the invention relate generally to assisted navigation systems and more particularly, for example, to systems and methods for assisted navigation systems based on surrounding threats.

BACKGROUND

Marine navigation is the use of navigation techniques to guide a vessel from one point to the next. Marine navigation is utilized to locate a current position, determine a course, and monitor the course. There are many different marine navigation methods, instruments, and systems utilized to navigate waterways. Current marine navigation methods include celestial navigation, dead reckoning, inertial navigation, and electronic navigation. Locations may be determined based on a previous location (dead reckoning), or based on some sort of object (star, landmark, or buoy). Some commonly used tools include compass, GPS, radar, and sextant. However, computer-assisted marine navigation has some drawbacks when considering items such as tide height, collision clutter, context, alerts, sensors, sensor auto-calibration, and chart decluttering. Thus, there is a need for a methodology that can accurately and reliably detect dangerous situations and provide visual and/or audible alarms with ample warning.

SUMMARY

Techniques are disclosed for systems and methods for assisted navigation. In accordance with one or more embodiments, a method is provided that receives data from a plurality of sensors associated with a mobile structure; determines a plurality of navigational hazards disposed within a monitored area associated with the mobile structure; processes the data and/or the navigational hazards to determine an operational context of the mobile structure; generates a context-dependent navigational chart for the mobile structure, wherein the navigational chart comprises greater or fewer of the navigational hazards in response to the determined operational context; and updates the navigational chart in response to changes in the data.

In various embodiments, an assisted navigation system may include a user interface device providing a display, wherein the user interface device is associated with a mobile structure; and a logic device configured to communicate with the user interface device and a plurality of sensors associated with the mobile structure. The logic device is configured to: receive data from the sensors, determine a plurality of navigational hazards disposed within a monitored area associated with the mobile structure, process the data and/or the navigational hazards to determine an operational context of the mobile structure, generate a context-dependent navigational chart for the mobile structure, wherein the navigational chart comprises greater or fewer of the navigational hazards in response to the determined operational context, and update the navigational chart in response to changes in the data.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 29 illustrates a flow diagram of a process to provide assisted navigation for a mobile structure implemented with an assisted navigation system in accordance with an embodiment of the disclosure.

Embodiments of the invention and their advantages are best understood by referring to the detailed description that follows. It should be appreciated that like reference numerals are used to identify like elements illustrated in one or more of the figures.

DETAILED DESCRIPTION

Figure 1A:
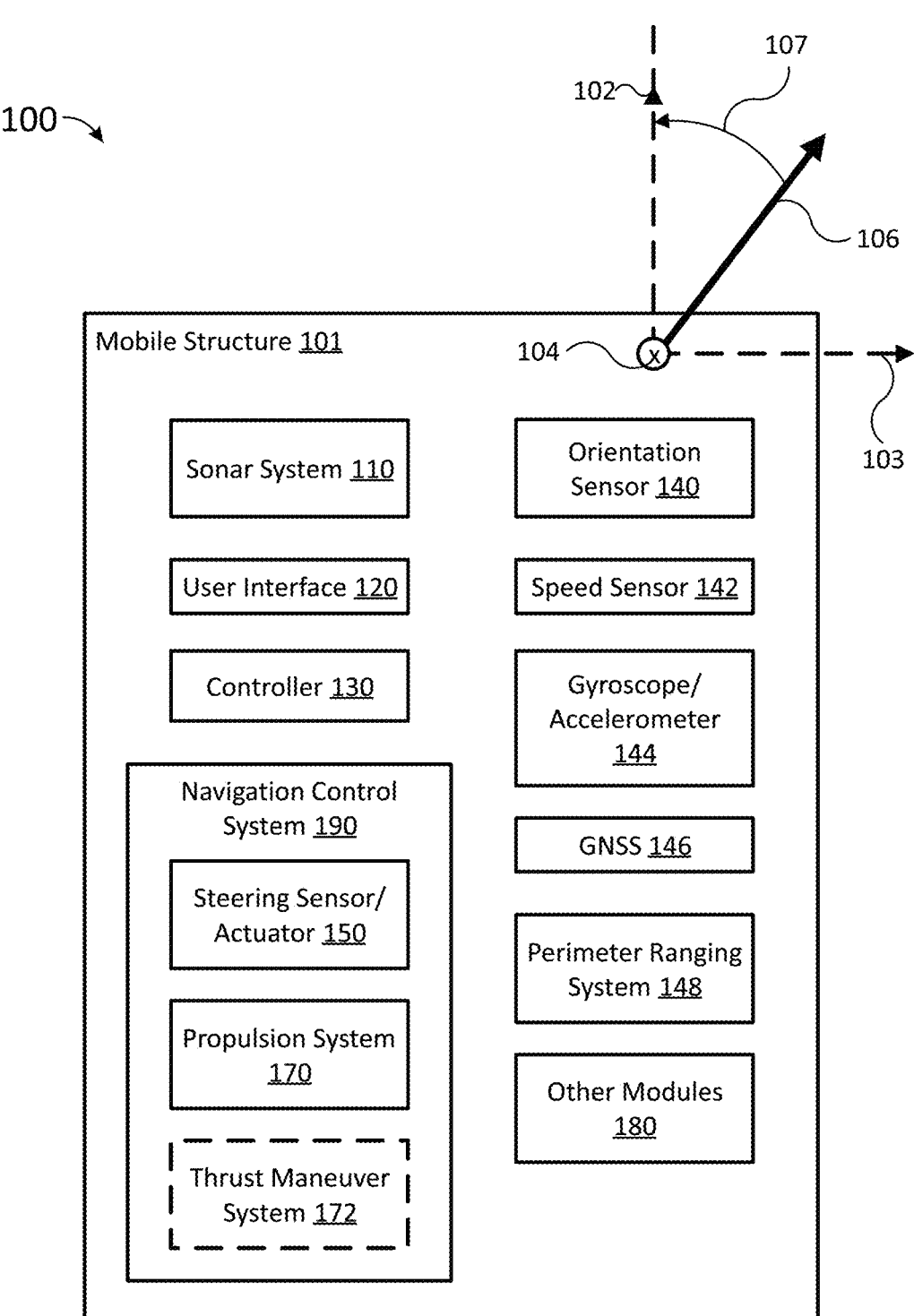
FIG. 1A illustrates a block diagram of a mobile structure including an assisted navigation system in accordance with an embodiment of the disclosure.

In accordance with various embodiments of the present disclosure, assisted navigation systems and methods are provided. Utilizing a sensor data from a plurality of sensors associated with a mobile structure, a plurality of navigational hazards disposed within a monitored area associated with the mobile structure are determined and the data and the navigational hazards are processed to determine an operational context of the mobile structure. As such, operational context accounts for both the state of a mobile structure (e.g., a watercraft) and the navigational hazards in the monitored area. For example, in some embodiments, the operational context may be a number, a sensitivity value, a data construct, and/or other appropriate representation of such information. A context-dependent navigational chart for the mobile structure is then generated that comprises greater or fewer of the navigational hazards in response to the determined operational context. The navigational chart is then updated in response to changes in the sensor data.

That is, the assisted navigation systems and methods are based on a robust database of surrounding threats. Multiple sensor information is merged and, after automatic calibration, utilized for georeferencing. For example, tide height is interpolated so that shallow waters may be detected, collision warnings are operational context-dependent since proximity mid-water is perceived differently to inshore, etc. Thus, using all available sensor information, dangerous situations may be detected and visual and/or audible alarms may be provided with ample warning. A user interface device is provided that is designed to avoid overwhelming a pilot of a marine vessel, hereinafter referred to simply as vessel, with data, drawing the pilot's attention to relevant information and, if an alarm occurs, identifying a dangerous condition. Such information is presented in a decluttered way using an elevated three-dimensional view on a multifunction display.

In various embodiments, the generation of the context-dependent navigational chart may be based on one or more thresholds (e.g., threshold values) associated with any of the various data or information discussed herein. In some embodiments, such thresholds may be user adjustable.

Aspects that may be considered to assist a pilot of a marine vessel when navigating a waterway include tide height/keel depths, collision decluttering, operational context, collision detection, smart alerting, sensor fusion, sensor auto calibration, and chart decluttering. Tide height and keel depths are considered to determine risks of unsafe water ahead. Collision decluttering is considered to focus on an appropriate subset of risks rather than current solutions that display numerous potential areas of risks, which increases as more sensors are added thereby increasing the clutter. Collision decluttering focuses on the appropriate subset of risks associated with the current marine vessel and does not paint layers of risks on top of each other either when zoomed out or zoomed in. Operational context is considered for the safe clearance for objects such as other marine vessels depending on operational context (e.g., passing 1 nautical mile (NM) ahead of a tanker in the English Channel is dangerous, whereas 50 meters ahead of a sailboat is a normal passing distance in the River Hamble) and vessel characteristics (e.g., vessel speed, Automatic Identification System (AIS) class (small sailboat, large tanker, etc.), convolutional neural network (CNN) classification, etc.). Smart alerting is considered to present the situation and emerging risks to avoid overloading the pilot, to allow immediate interpretation of the situation, and ideally diffuse risks before the situation and emerging risks become dangers. Spoken alarms may be included for highest priority dangers. The manner of alerting may vary depending on the phase of the threat. For example, wake a sleeping display, zoom to bring the threat into view, highlight the danger (flashing, brighter, red . . . ), audible alarm, etc. For example, in some embodiments, an alert may provide additional advisory information such as 'you are the stand on vessel'. Sensor fusion considers all data sources, such as radar, AIS, carto, depth sounders, etc. Currently system, such as radar, AIS, carto, and depth sounders, each have their own set up and alarms. False alarms are a significant problem and designing a system with a low false alarm rate (FAR) is a major challenge. Sensor fusion provides a holistic approach between all data sources to minimize false alarms and simplifying setup. Sensor automatic calibration is considered for sensor fusion to operate correctly. Current systems are 'plug and play' so that pilots put minimal effort into calibration of leisure maritime systems. However, for sensor fusion to operate properly, sensor automatic calibration must be highly accurate. An azimuth error of 5° corresponds to 150 meters at 1 NM range and a tilt error of 1° on a camera may corresponds to 100 seconds of meters if the camera is mounted at deck height. Finally, chart decluttering is considered to minimize the cognitive load on the pilot. That is, currently, pilots are provides a display with enormous amounts of irrelevant data (e.g., depth sounding 10 miles away), from which they must extract the important, relevant parts. Chart decluttering provides a perspective $3^{rd}$ person viewpoint displaying only relevant data.

Thus, embodiments provide an assisted navigation system that detects dangerous situations and alert the pilot as the dangerous situations arise in a decluttered view on a multifunction display. Additionally, the assisted navigation system advises the pilot of a proposed best course of action. Moreover, if equipped, the assisted navigation system may automatically navigate the vessel way from the dangerous situation. The assisted navigation system may utilize one or more sensors such as, for example, a Lighthouse chart, a global positioning system (GPS), an automatic identification system (AIS), a radar, cameras, etc. One or more of the sensors may require a convolutional neural network (CNN), since non-water objects must be detected and classified, and a dedicated graphics processing unit (GPU).

FIG. 1A illustrates a block diagram of an assisted navigation system 100 in accordance with an embodiment of the disclosure. In various embodiments, system 100 may be adapted to provide sea traffic management (STM) sensor calibration for a particular mobile structure 101. In some embodiments, system 100 may be adapted to measure an orientation, a position, and/or a velocity of mobile structure 101. System 100 may then use these measurements to provide STM sensor calibration, which may then be used to control operation of mobile structure 101, such as controlling elements of navigation control system 190 (e.g., steering actuator 150, propulsion system 170, and/or optional thrust maneuver system 172) to steer or orient mobile structure 101 according to a desired heading or orientation, such as heading angle 107, for example.

In the embodiment shown in FIG. 1A, system 100 may be implemented to provide STM sensor calibration for a particular type of mobile structure 101, such as a drone, a watercraft, an aircraft, a robot, a vehicle, and/or other types of mobile structures. In one embodiment, system 100 may include one or more of a sonar system 110, a user interface device 120, a controller 130, an orientation sensor 140, a speed sensor 142, a gyroscope/accelerometer 144, a global navigation satellite system (GNSS) 146, a perimeter ranging system 148, a steering sensor/actuator 150, a propulsion system 170, a thrust maneuver system 172, and one or more other sensors and/or actuators used to sense and/or control a state of mobile structure 101, such as other modules 180. Additionally, system 100 may include a database 195 of location dependent navigational hazards for use in determining an operational context associated with mobile structure 101. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope/accelerometer 144). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation).

In some embodiments, directional measurements may initially be referenced to a coordinate frame of a particular sensor (e.g., a sonar transducer assembly or module of sonar system 110) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 referenced to a local gravitational vector but with an unreferenced and/or undefined yaw reference (e.g., no reference to Magnetic North).

Sonar system 110 may be implemented with one or more electrically and/or mechanically coupled controllers, transmitters, receivers, transceivers, signal processing logic devices, autonomous power systems, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein. Sonar system 110 may be configured to emit one, multiple, or a series of acoustic beams, receive corresponding acoustic returns, and convert the acoustic returns into sonar data and/or imagery, such as bathymetric data, water depth, water temperature, water column/volume debris, bottom profile, and/or other types of sonar data. Sonar system 110 may be configured to provide such data and/or imagery to user interface device 120 for display to a user, for example, or to controller 130 for additional processing, as described herein.

For example, in various embodiments, sonar system 110 may be implemented and/or operated according to any one or combination of the systems and methods described in U.S. Provisional Patent Application 62/005,838 filed May 30, 2014 and entitled "MULTICHANNEL SONAR SYSTEMS AND METHODS", U.S. Provisional Patent Application 61/943,170 filed Feb. 21, 2014 and entitled "MODULAR SONAR TRANSDUCER ASSEMBLY SYSTEMS AND METHODS", and/or U.S. Provisional Patent Application 62/087,189 filed Dec. 3, 2014 and entitled "AUTONOMOUS SONAR SYSTEMS AND METHODS", each of which are hereby incorporated by reference in their entirety. In other embodiments, sonar system 110 may be implemented according to other sonar system arrangements that can be used to detect objects within a water column and/or a floor of a body of water.

User interface device 120 may be implemented as one or more of a display, a touch screen, a keyboard, a mouse, a joystick, a knob, a steering wheel, a ship's wheel or helm, a yoke, and/or any other device capable of accepting user input and/or providing feedback to a user. For example, in some embodiments, user interface device 120 may be implemented and/or operated according to any one or combination of the systems and methods described in U.S. Provisional Patent Application 62/069,961 filed Oct. 29, 2014 and entitled "PILOT DISPLAY SYSTEMS AND METHODS", which is hereby incorporated by reference in its entirety.

In various embodiments, user interface device 120 may be adapted to provide user input (e.g., as a type of signal and/or sensor information) to other devices of system 100, such as controller 130. User interface device 120 may also be implemented with one or more logic devices that may be adapted to execute instructions, such as software instructions, implementing any of the various processes and/or methods described herein. For example, user interface device 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods described herein.

In some embodiments, user interface device 120 may be adapted to accept user input, for example, to form a communication link, to select a particular wireless networking protocol and/or parameters for a particular wireless networking protocol and/or wireless link (e.g., a password, an encryption key, a media access control (MAC) address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface device 120 accepts a user input, the user input may be transmitted to other devices of system 100 over one or more communication links.

In one embodiment, user interface device 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface device 120 may be adapted to process sensor and/or control signals to determine sensor and/or other information. For example, a sensor signal may include an orientation, an angular velocity, an acceleration, a speed, and/or a position of mobile structure 101 and/or other elements of system 100. In such embodiments, user interface device 120 may be adapted to process the sensor signals to determine sensor information indicating an estimated and/or absolute roll, pitch, and/or yaw (attitude and/or rate), and/or a position or series of positions of mobile structure 101 and/or other elements of system 100, for example, and display the sensor information as feedback to a user.

In one embodiment, user interface device 120 may be adapted to display a time series of various sensor information and/or other parameters as part of or overlaid on a graph or map, which may be referenced to a position and/or orientation of mobile structure 101 and/or other element of system 100. For example, user interface device 120 may be adapted to display a time series of positions, headings, and/or orientations of mobile structure 101 and/or other elements of system 100 overlaid on a geographical map, which may include one or more graphs indicating a corresponding time series of actuator control signals, sensor information, and/or other sensor and/or control signals.

In some embodiments, user interface device 120 may be adapted to accept user input including a user-defined target heading, waypoint, route, and/or orientation for an element of system 100, for example, and to generate control signals for navigation control system 190 to cause mobile structure 101 to move according to the target heading, waypoint, route, track, and/or orientation. In other embodiments, user interface device 120 may be adapted to accept user input modifying a control loop parameter of controller 130, for example, or selecting a responsiveness of controller 130 in controlling a direction (e.g., through application of a particular steering angle) of mobile structure 101.

For example, a responsiveness setting may include selections of Performance (e.g., fast response), Cruising (medium response), Economy (slow response), and Docking responsiveness, where the different settings are used to choose between a more pronounced and immediate steering response (e.g., a faster control loop response) or reduced steering actuator activity (e.g., a slower control loop response). In some embodiments, a responsiveness setting may correspond to a maximum desired lateral acceleration during a turn. In such embodiments, the responsiveness setting may modify a gain, a deadband, a limit on an output, a bandwidth of a filter, and/or other control loop parameters of controller 130, as described herein.

In further embodiments, user interface device 120 may be adapted to accept user input including a user-defined target attitude, orientation, and/or position for an actuated device (e.g., sonar system 110) associated with mobile structure 101, for example, and to generate control signals for adjusting an orientation and/or position of the actuated device according to the target attitude, orientation, and/or position. More generally, user interface device 120 may be adapted to display sensor information to a user, for example, and/or to transmit sensor information and/or user input to other user interface devices, sensors, or controllers of system 100, for instance, for display and/or further processing.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of navigation control system 190, mobile structure 101, and/or other elements of system 100, for example. Such software instructions may also implement methods for processing sensor signals, determining sensor information, providing user feedback (e.g., through user interface device 120), querying devices for operational parameters, selecting operational parameters for devices, or performing any of the various operations described herein (e.g., operations performed by logic devices of various devices of system 100).

In addition, a machine-readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface device 120. In some embodiments, controller 130 may be integrated with one or more user interface devices (e.g., user interface device 120) and/or may share a communication module or modules.

As noted herein, controller 130 may be adapted to execute one or more control loops to model or provide device control, steering control (e.g., using navigation control system 190) and/or performing other various operations of mobile structure 101 and/or system 100. In some embodiments, a control loop may include processing sensor signals and/or sensor information to control one or more operations of mobile structure 101 and/or system 100.

For example, controller 130 may be adapted to receive a measured heading 107 of mobile structure 101 from orientation sensor 140, a measured steering rate (e.g., a measured yaw rate, in some embodiments) from gyroscope/accelerometer 144, a measured speed from speed sensor 142, a measured position or series of absolute and/or relative positions from GNSS 146, a measured steering angle from steering sensor/actuator 150, perimeter sensor data from perimeter ranging system 148, and/or a user input from user interface device 120. In some embodiments, a user input may include a target heading 106, for example, an absolute position and/or waypoint (e.g., from which target heading 106 may be derived), and/or one or more other control loop parameters. In further embodiments, controller 130 may be adapted to determine a steering demand or other control signal for navigation control system 190 based on one or more of the received sensor signals, including the user input, and provide the steering demand/control signal to steering sensor/actuator 150 and/or navigation control system 190.

In some embodiments, a control loop may include a nominal vehicle predictor used to produce a feedback signal corresponding to an average or nominal vehicle/mobile structure rather than one specific to mobile structure 101. Such feedback signal may be used to adjust or correct control signals, as described herein. In some embodiments, a control loop may include one or more vehicle dynamics modules corresponding to actual vehicles, for example, that may be used to implement an adaptive algorithm for training various control loop parameters, such as parameters for a nominal vehicle predictor, without necessitating real-time control of an actual mobile structure.

Orientation sensor 140 may be implemented as one or more of a compass, float, accelerometer, and/or other device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide a pitch, pitch rate, roll, roll rate, yaw, and/or yaw rate for mobile structure 101 (e.g., using a time series of orientation measurements). In such embodiments, controller 130 may be configured to determine a compensated yaw rate based on the provided sensor signals. In various embodiments, a yaw rate and/or compensated yaw rate may be approximately equal to a steering rate of mobile structure 101. Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101. For example, speed sensor 142 may be configured to provide an absolute or relative wind velocity or water velocity impacting mobile structure 101. In various embodiments, system 100 may include multiple embodiments of speed sensor 142, such as one wind velocity sensor and one water velocity sensor. In various embodiments, speed sensor 142 may be referred to as an STM sensor.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface device 120, controller 130). In some embodiments, gyroscope/accelerometer 144 may be adapted to determine pitch, pitch rate, roll, roll rate, yaw, yaw rate, compensated yaw rate, an absolute speed, and/or a linear acceleration rate of mobile structure 101. Thus, gyroscope/accelerometer 144 may be adapted to provide a measured heading, a measured steering rate, and/or a measured speed for mobile structure 101. In some embodiments, gyroscope/accelerometer 144 may provide pitch rate, roll rate, yaw rate, and/or a linear acceleration of mobile structure 101 to controller 130 and controller 130 may be adapted to determine a compensated yaw rate based on the provided sensor signals. Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GNSS 146 may be implemented as a global positioning satellite receiver and/or other device capable of determining an absolute and/or relative position of mobile structure 101 based on wireless signals received from space-born and/or terrestrial sources, for example, and capable of providing such measurements as sensor signals that may be communicated to various devices of system 100. In some embodiments, GNSS 146 may be adapted to determine and/or estimate a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information. GNSS 146 may also be used to estimate a relative wind velocity or a water current velocity, for example, using a time series of position measurements while mobile structure is otherwise lacking powered navigation control.

Perimeter ranging system 148 may be adapted to detect navigation hazards within a monitoring perimeter of mobile structure 101 (e.g., within a preselected or predetermined range of a perimeter of mobile structure 101) and measure ranges to the detected navigation hazards (e.g., the closest approach distance between a perimeter of mobile structure 101 and a detected navigation hazard) and/or relative velocities of the detected navigation hazards. In some embodiments, perimeter ranging system 148 may be implemented by one or more ultrasonic sensor arrays distributed along the perimeter of mobile structure 101, radar systems, short range radar systems (e.g., including radar arrays configured to detect and/or range objects between a few centimeters and 10 s of meters from a perimeter of mobile structure 101), visible spectrum and/or infrared/thermal imaging modules or cameras, stereo cameras, light detection and ranging (LIDAR) systems, combinations of these, and/or other perimeter ranging systems configured to provide relatively fast and accurate perimeter sensor data (e.g., so as to accommodate suddenly changing navigation conditions due to external disturbances such as tide and wind loadings on mobile structure 101).

Navigation hazards, as used herein, may include an approaching dock or tie down post, other vehicles, floating debris, mooring lines, swimmers or water life, and/or other navigation hazards large and/or solid enough to damage mobile structure 101, for example, or that require their own safety perimeter due to regulation, safety, or other concerns. As such, in some embodiments, perimeter ranging system 148 and/or controller 130 may be configured to differentiate types of navigation hazards and/or objects or conditions that do not present a navigation hazard, such as seaweed, pollution slicks, relatively small floating debris (e.g., depending on a relative speed of the floating debris), and/or other non-hazardous but detectable objects.

Steering sensor/actuator 150 may be adapted to physically adjust a heading of mobile structure 101 according to one or more control signals, user inputs, and/or stabilized attitude estimates provided by a logic device of system 100, such as controller 130. Steering sensor/actuator 150 may include one or more actuators and control surfaces (e.g., a rudder or other type of steering mechanism) of mobile structure 101 and may be adapted to sense and/or physically adjust the control surfaces to a variety of positive and/or negative steering angles/positions.

Figure 1B:
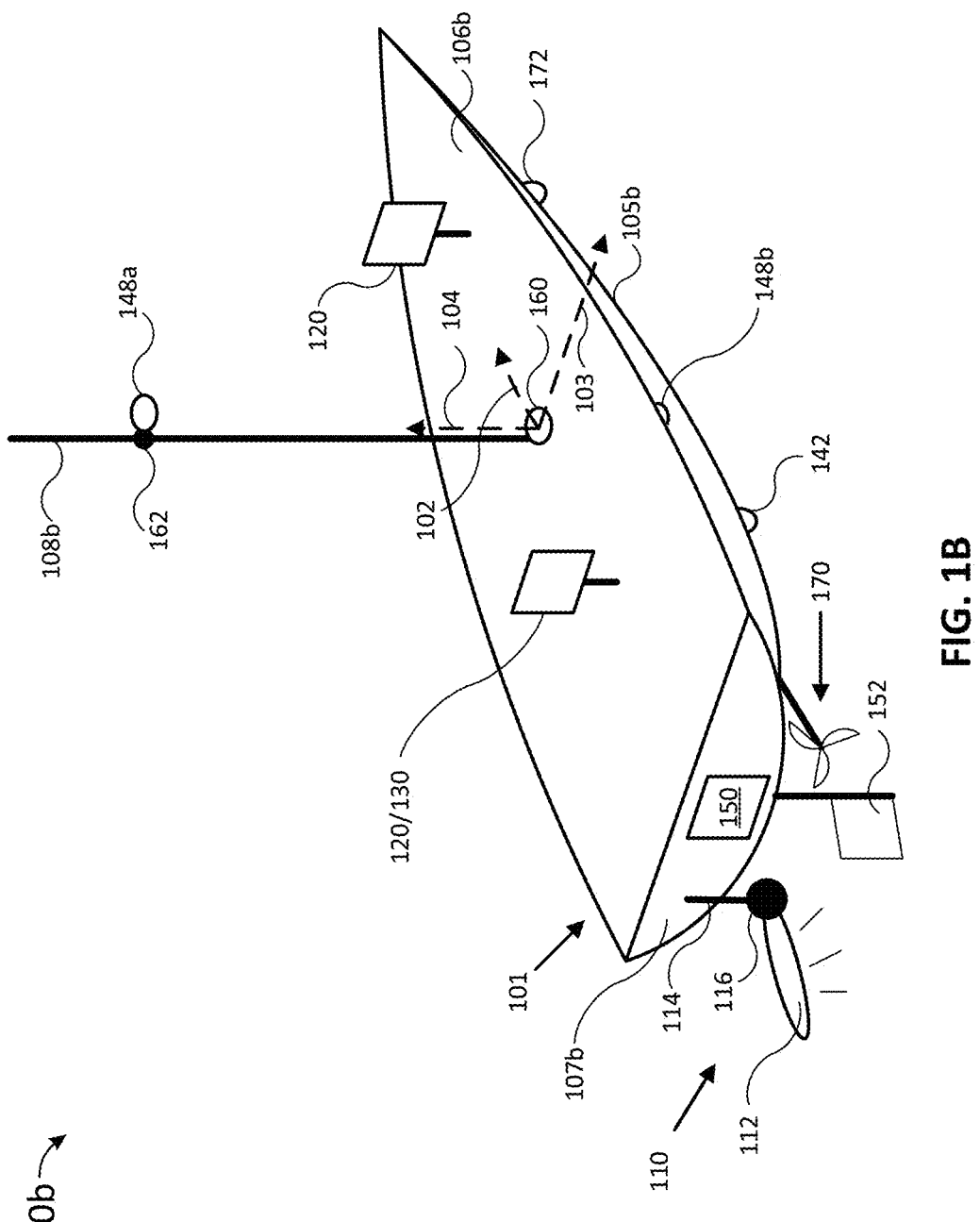
FIG. 1B illustrates a diagram of a watercraft including an assisted navigation system in accordance with an embodiment of the disclosure.
Figure 1C:
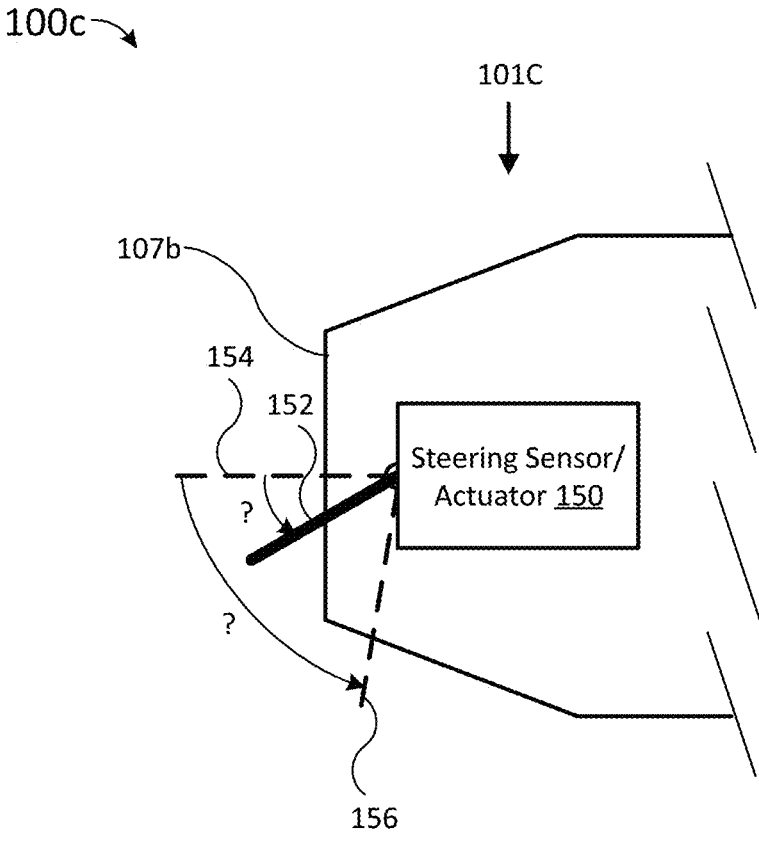
FIG. 1C illustrates a diagram of a steering sensor/actuator for an assisted navigation system in accordance with an embodiment of the disclosure.

For example, FIG. 1C illustrates a diagram of a steering sensor/actuator for an assisted navigation system in accordance with an embodiment of the disclosure. As shown in FIG. 1C, rear portion 101C of mobile structure 101 includes steering sensor/actuator 150 configured to sense a steering angle of rudder 152 and/or to physically adjust rudder 152 to a variety of positive and/or negative steering angles, such as a positive steering angle $\alpha$ measured relative to a zero steering angle direction (e.g., designated by a dashed line 134). In various embodiments, steering sensor/actuator 150 may be implemented with a steering actuator angle limit (e.g., the positive limit is designated by an angle $\beta$ and a dashed line 136 in FIG. 1C), and/or a steering actuator rate limit "R".

As described herein, a steering actuator rate limit may be a limit of how quickly steering sensor/actuator 150 can change a steering angle of a steering mechanism (e.g., rudder 132), and, in some embodiments, such steering actuator rate limit may vary depending on a speed of mobile structure 101 along heading 104 (e.g., a speed of a ship relative to surrounding water, or of a plane relative to a surrounding air mass). In further embodiments, a steering actuator rate limit may vary depending on whether steering sensor/actuator 150 is turning with (e.g., an increased steering actuator rate limit) or turning against (e.g., a decreased steering actuator rate limit) a prevailing counteracting force, such as a prevailing current (e.g., a water and/or air current). A prevailing current may be determined from sensor signals provided by orientation sensor 140, gyroscope/accelerometer 142, speed sensor 144, and/or GNSS 146, for example.

In various embodiments, steering sensor/actuator 150 may be implemented as several separate sensors and/or actuators, for example, to sense and/or control one or more steering mechanisms substantially simultaneously, such as one or more rudders, elevators, and/or automobile steering mechanisms, for example. In some embodiments, steering sensor/actuator 150 may include one or more sensors and/or actuators adapted to sense and/or adjust a propulsion force (e.g., a propeller speed and/or an engine rpm) of mobile structure 101, for example, to affect a particular navigation maneuver (e.g., to meet a particular steering demand within a particular period of time), for instance, or to provide a safety measure (e.g., an engine cut-off and/or reduction in mobile structure speed).

In some embodiments, rudder 152 (e.g., a steering mechanism) may be implemented as one or more control surfaces and/or conventional rudders, one or more directional propellers and/or vector thrusters (e.g., directional water jets), a system of fixed propellers and/or thrusters that can be powered at different levels and/or reversed to affect a steering rate of mobile structure 101, and/or other types or combination of types of steering mechanisms appropriate for mobile structure 101. In embodiments where rudder 152 is implemented, at least in part, as a system of fixed propellers and/or thrusters, steering angle $\alpha$ may represent an effective and/or expected steering angle based on, for example, characteristics of mobile structure 101, the system of fixed propellers and/or thrusters (e.g., their position on mobile structure 101), and/or control signals provided to steering sensor/actuator 150. An effective and/or expected steering angle $\alpha$ may be determined by controller 130 according to a pre-determined algorithm, for example, or through use of an adaptive algorithm for training various control loop parameters characterizing the relationship of steering angle α to, for instance, power levels provided to the system of fixed propellers and/or thrusters and/or control signals provided by controller 130, as described herein.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and/or may be coupled to and/or integrated with steering sensor/actuator 150, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example. As such, in some embodiments, propulsion system 170 may be integrated with steering sensor/actuator 150.

Optional thrust maneuver system 172 may be adapted to physically adjust a position, orientation, and/or linear and/or angular velocity of mobile structure 101 according to one or more control signals and/or user inputs provided by a logic device of system 100, such as controller 130. Thrust maneuver system 172 may be implemented as one or more directional propellers and/or vector thrusters (e.g., directional water jets), and/or a system of fixed propellers and/or thrusters coupled to mobile structure 101 that can be powered at different levels and/or reversed to maneuver mobile structure 101 according to a desired linear and/or angular velocity.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example. In some embodiments, other modules 180 may include one or more actuated and/or articulated devices (e.g., spotlights, visible and/or IR cameras, radars, sonars, and/or other actuated devices) coupled to mobile structure 101, where each actuated device includes one or more actuators adapted to adjust an orientation of the device, relative to mobile structure 101, in response to one or more control signals (e.g., provided by controller 130).

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing any of the methods described herein, for example, including for transmitting and/or receiving communications, such as sensor signals, sensor information, and/or control signals, between one or more devices of system 100. In various embodiments, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), controller area network (CAN) bus interfaces, and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, to facilitate wired and/or wireless communications between one or more devices of system 100. Such components may be integrated with a corresponding element of system 100, for example. In some embodiments, the same or similar components may be used to perform one or more sensor measurements, as described herein.

Sensor signals, control signals, and other signals may be communicated among elements of system 100 using a variety of wired and/or wireless communication techniques, including voltage signaling, Ethernet, Wi-Fi, Bluetooth, Zigbee, Xbee, Micronet, CAN bus, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements. For example, gyroscope/accelerometer 144 and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries, capacitors, or other electrical power storage devices, for example, and may include one or more solar cell modules or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of other elements of system 100 to/from a coordinate frame of mobile structure 101, at-rest and/or in-motion, and/or other coordinate frames, as described herein. One or more logic devices of system 100 may be adapted to use such parameters to transform a coordinate frame of the other elements of system 100 to/from a coordinate frame of orientation sensor 140 and/or mobile structure 101, for example. Furthermore, such parameters may be used to determine and/or calculate one or more adjustments to an orientation of an element of system 100 that would be necessary to physically align a coordinate frame of the element with a coordinate frame of orientation sensor 140 and/or mobile structure 101, for example, or an absolute coordinate frame and/or other desired positions and/or orientations. Adjustments determined from such parameters may be used to selectively power adjustment servos/actuators (e.g., of various elements of system 100), for example, or may be communicated to a user through user interface device 120, as described herein.

FIG. 1B illustrates a diagram of system 100B in accordance with an embodiment of the disclosure. In the embodiment shown in FIG. 1B, system 100B may be implemented to provide STM sensor calibration and/or additional operational control of mobile structure 101, similar to system 100 of FIG. 1B. For example, system 100B may include integrated user interface device/controller 120/130, secondary user interface device 120, perimeter ranging system 148a and 148b, steering sensor/actuator 150, sensor cluster 160 (e.g., orientation sensor 140, gyroscope/accelerometer 144, and/or GNSS 146), and various other sensors and/or actuators. In the embodiment illustrated by FIG. 1B, mobile structure 101 is implemented as a motorized boat including a hull 105b, a deck 106b, a transom 107b, a mast/sensor mount 108b, a rudder 152, an inboard motor 170, articulated thrust maneuver jet 172, an actuated sonar system 110 coupled to transom 107b, perimeter ranging system 148a (e.g., a camera system, radar system, and/or LIDAR system) coupled to mast/sensor mount 108b, optionally through roll, pitch, and/or yaw actuator 162, and perimeter ranging system 148b (e.g., an ultrasonic sensor array and/or short range radar system)) coupled to hull 105b or deck 106b substantially above a water line of mobile structure 101. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, mobile structure 101 includes actuated sonar system 110, which in turn includes transducer assembly 112 coupled to transom 107b of mobile structure 101 through assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface device/controller 120/130. Similarly, actuator 162 may be adapted to adjust an orientation of perimeter ranging system 148 according to control signals and/or an orientation or position of mobile structure 101 provided by user interface device/controller 120/130. For example, user interface device/controller 120/130 may be adapted to receive an orientation of transducer assembly 112 and/or perimeter ranging system 148 (e.g., from sensors embedded within the assembly or device), and to adjust an orientation of cither to maintain sensing/illuminating a position and/or absolute direction in response to motion of mobile structure 101, using one or more orientations and/or positions of mobile structure 101 and/or other sensor information derived by executing various methods described herein.

In one embodiment, user interface device 120 may be mounted to mobile structure 101 substantially on deck 106b and/or mast/sensor mount 108b. Such mounts may be fixed, for example, or may include gimbals and other leveling mechanisms/actuators so that a display of user interface device 120 stays substantially level with respect to a horizon and/or a "down" vector (e.g., to mimic typical user head motion/orientation). In another embodiment, at least one of user interface device 120 may be located in proximity to mobile structure 101 and be mobile throughout a user level (e.g., deck 106b) of mobile structure 101. For example, secondary user interface device 120 may be implemented with a lanyard and/or other type of strap and/or attachment device and be physically coupled to a user of mobile structure 101 so as to be in proximity to mobile structure 101. In various embodiments, user interface device 120 may be implemented with a relatively thin display that is integrated into a PCB of the corresponding user interface device to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed, such as a STM or speed through water (STW) sensor configured to measure the relative speed of mobile structure 101 through a surrounding water medium, substantially along longitudinal axis 102. In some embodiments, speed sensor 142 may be adapted to provide a relatively thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101 and/or sensor cluster 160. Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cell modules or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

As discussed previously, controller 130 may be adapted to detect navigation hazards within a monitoring perimeter of mobile structure 101. A safe depth depends on tide height, keel depth, wave height, and a safety margin. Controller 130 may interpolate tide height from a set of nearby tide stations with triangulation (weighted mean between a nearest number (e.g., three) tide stations based on position). In most regions, changes in tide height between tide stations is minimal, so interpolation will be accurate. In some regions, there are substantial changes over small distances, but this is signaled by fast flow (races). Therefore, controller 130 weights the tide height interpolation according to current (speed). Controller 130 find and validates difficult regions by inspecting world maps for fast flowing current and focuses validation on these areas. The principle is that fast flow indicates rapid change of tide height, so interpolation between tide stations may be nonlinear with the nonlinearity driven by the current data. Furthermore, interpolation may not happen across tide stations separated by land. Additionally, controller 130 may factor in atmospheric pressure plus a safety margin for local wind effects.

Again, to provide an assisted navigation system that does not overwhelm the plot of the vessel and draws the pilot's attention to relevant information and, if an alarm occurs, identifies a dangerous condition, the assisted navigation system of the illustrative embodiment takes into consideration tide height/keel depths, collision decluttering, operational context, smart alerting, sensor fusion, sensor auto calibration, and chart decluttering. Therefore, using all available sensor information, dangerous situations may be detected and visual and/or audible alarms may be provided via a user interface device of a multifunction display with ample warning.

The processes illustrated in the following flow diagrams and related Figures may be used to provide general navigational control for mobile structure 101. It should be appreciated that any step, sub-step, sub-process, or block of the processes may be performed in an order or arrangement different from the embodiments illustrated by the Figures. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although the processes are described with reference to systems, processes, control loops, and images described about FIGS. 1A-1C, the processes may be performed by other systems different from those systems, processes, control loops, and images and including a different selection of electronic devices, sensors, assemblies, mobile structures, and/or mobile structure attributes, for example.

Figure 2:
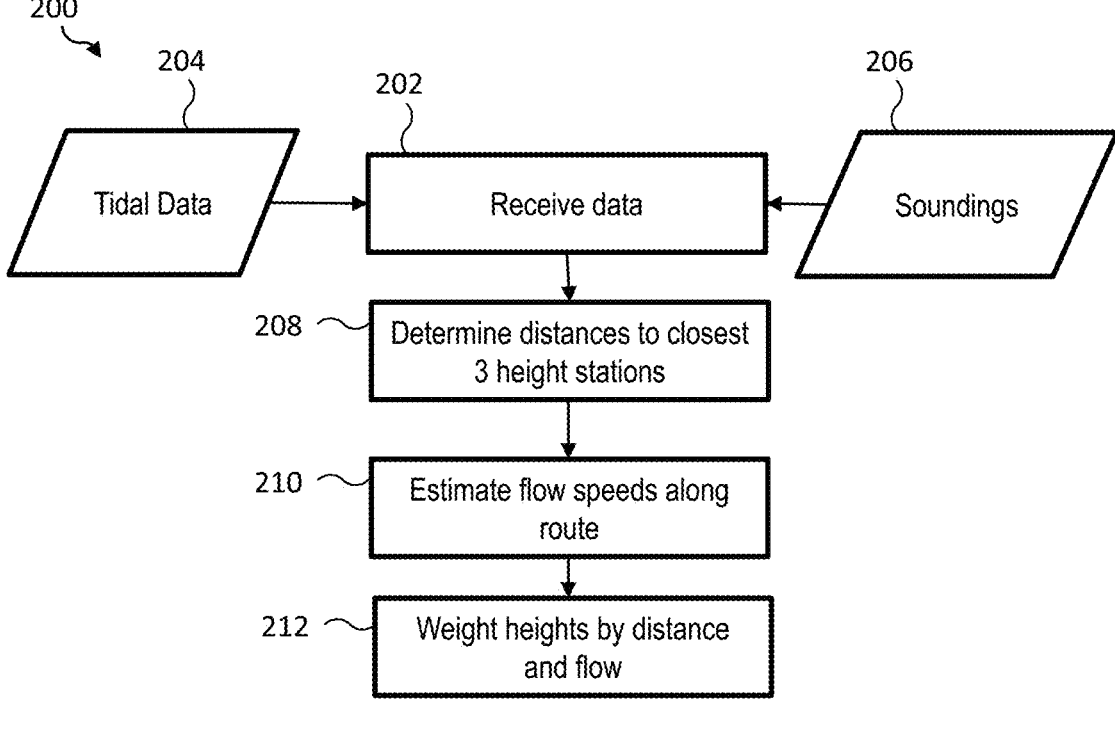
FIG. 2 illustrates a flow diagram of a process to determine tide height/keel depth for a mobile structure implemented with an assisted navigation system in accordance with an embodiment of the disclosure.

FIG. 2 illustrates a flow diagram of a process 200 to determine tide height/keel depth for mobile structure 101 implemented with assisted navigation system 100 in accordance with an embodiment of the disclosure. In block 202, controller 130 receives tidal data 204 from a set of tide stations that provides tidal heights and flows and sounding data 206 from a set of sounding stations that provides latitude and longitude sets of points with associated depths. In block 208, controller 130 uses the distances to a closest number, e.g., three, tide stations from tidal data 204 and detected land barriers from sounding data 206 to determine the shortest seaward route to each tidal height station. In block 210, controller 130 estimates flow speeds along route, i.e., along each route, controller 130 estimates the current using the nearest charted flow while taking land barriers into account. In block 212, controller 130 weights the tidal heights by distance and flow thereby creating a weighted mean of the closest number of tide heights where the weight depends not just on the distance (closest has highest weighting) but also flow speed, so that fast flow (e.g., tidal race) has the effect of reducing the weight.

Figure 3:
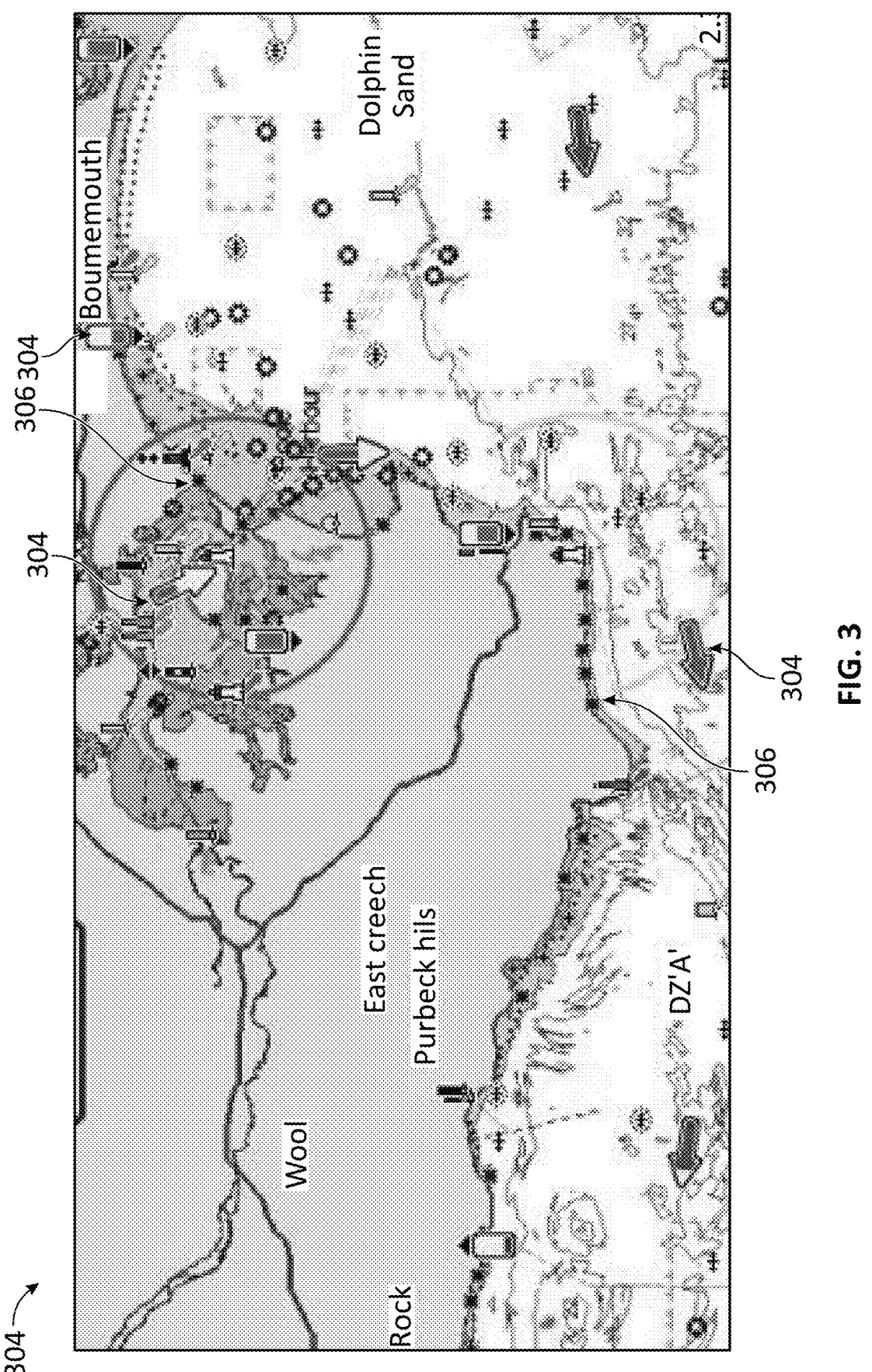
FIG. 3 depicts a map illustrating a set of tide height stations that provide tidal data as well as a set of sounding stations that provide sounding data in accordance with an embodiment of the disclosure.

FIG. 3 depicts a map 300 illustrating a set of tide height stations 304 that provide tidal data as well as a set of sounding stations 306 that provide sounding data in accordance with an embodiment of the disclosure. As is shown, the set of tide stations 304 provide tidal heights and flows and the set of sounding stations 306 that provides a latitude and longitude sets of points with associated depths indicating land barriers.

Figure 4:
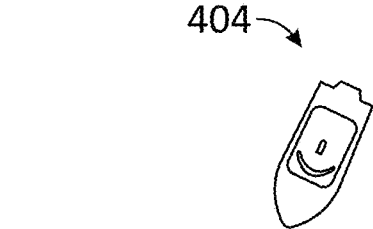
FIG. 4 depicts one exemplary PAD zone for a vessel identifying an intercept point where navigation will be unsafe at a future point in time in accordance with an embodiment of the disclosure.
Figure 4:
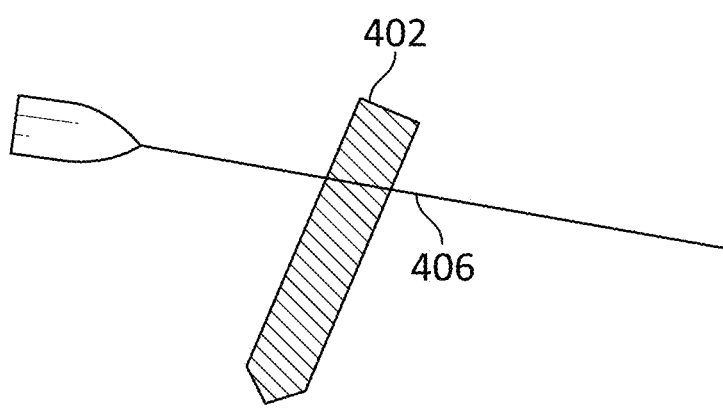

Regarding collision decluttering, current predicted areas of danger (PAD zones) cause clutter because they represent an area on a navigational chart which is typically 100 meters wide and may be 1000 meters long or longer. At high zoom levels, this area may be very significant. Further, boxes are projected ahead of the target but are disconnected from the target and so effectively double the number of targets. On current displays, PAD zones may be shown at the same time and they often overlap and irrelevant PAD zones may be shown, such as circles from moored yachts and moving targets where collision risk is distant. PAD zones as currently implemented show an area into which navigation will be unsafe at a future point in time. The PAD zone is positioned based on the heading which a pilot could steer to cause a collision assuming the pilot keeps a constant speed. This creates an intercept point and this point is extended forwards up to 1000 meters, as well as aft and sideways by 100 meters. FIG. 4 depicts one exemplary PAD zone 402 for vessel 404 identifying an intercept point 406 where navigation will be unsafe at a future point in time in accordance with an embodiment of the disclosure. Furthermore, it is often possible to have two intercept points (two dangerous steering angles), one corresponding to a head-on collision and one corresponding to being run down from behind. While it is unlikely that both collision risks exist, current systems 'plays safe' and allows for both, painting the entire region between them. Because of this, there may be significant overlay on the navigational chart in busy waters. Because each PAD zone is rendered at its own unique future point in time, the logic of the boxes may seem hard for pilots to understand.

Figure 5:
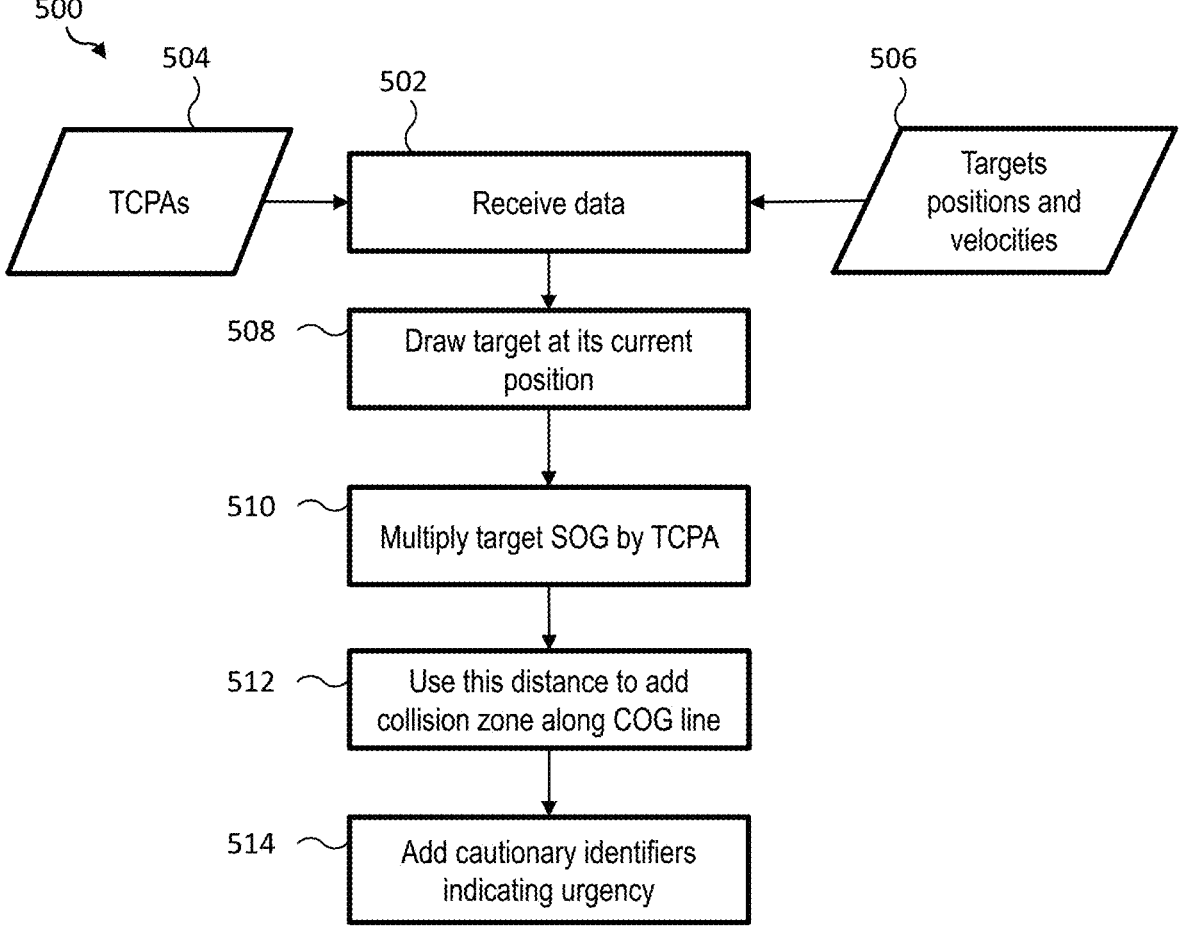
FIG. 5 illustrates a flow diagram of a process to control collision decluttering for a mobile structure implemented with an assisted navigation system in accordance with an embodiment of the disclosure.

FIG. 5 illustrates a flow diagram of a process 500 to control collision decluttering for mobile structure 101 implemented with assisted navigation system 100 in accordance with an embodiment of the disclosure. In block 502, controller 130 receives positions and targets information 504 associated with a plurality of navigational hazards and times to closest point of approach (TCPAs) 506 for each of the plurality of navigational hazards. The position and target information 504 associated with the plurality of navigational hazards may be predetermined data pulled from a database, such as database 195, or real-time data identified by other sensors and/or actuators, e.g. perimeter ranging system 148a and 148b, steering sensor/actuator 150, sensor cluster 160 (e.g., orientation sensor 140, gyroscope/accelerometer 144, and/or GNSS 146), etc. In block 508, for each navigational hazard in the plurality of navigational hazards, controller 130 locates a navigational hazard at its current position on the multifunction display. In block 510, for each navigational hazard in the plurality of navigational hazards, controller 130 multiplies the navigational hazard's speed over ground (SOG) by the navigational hazard's TCPA to identify the distance from the mobile structure 101. In block 512, controller 130 uses the determined distance to add a collision zone along the course over ground (COG). Then, in block 514, controller 130 adds cautionary identifiers indicating urgency, such as highlighted color codes. That is, to control clutter, controller 130 prioritizes which navigational hazards to highlight using a concept of urgency, where a degree of urgency affects the highlighting, i.e., only urgent targets are highlighted. Navigational hazards may be boats, targets, a fishing float classified by convolutional neural network (CNN), a navigational mark, a sandbank, etc.

Figure 6:
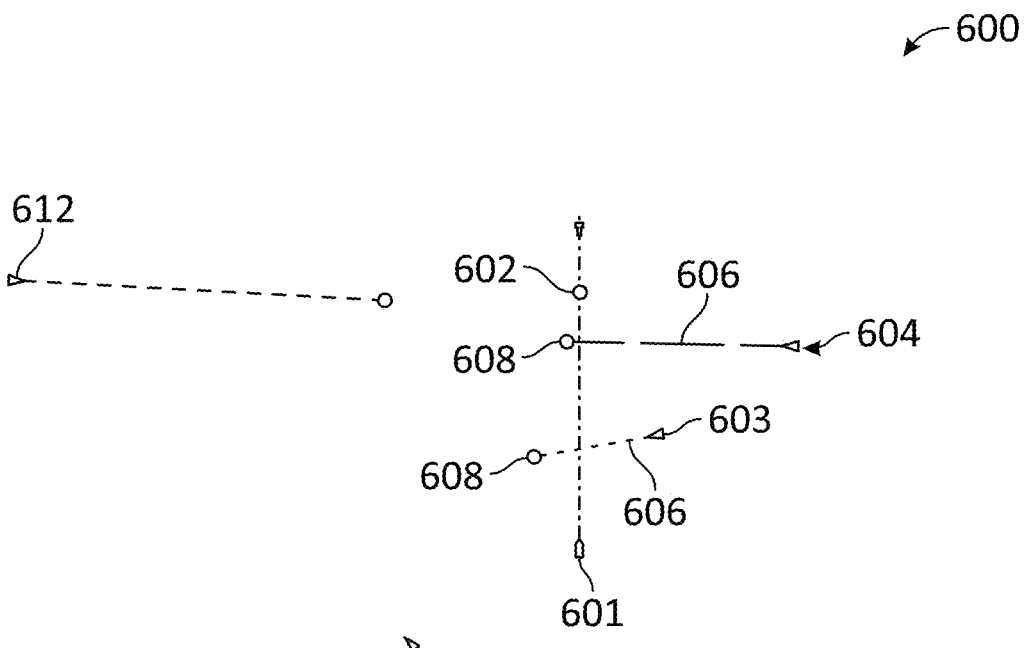
FIG. 6 illustrates an exemplary collision decluttering display that controls collision decluttering for a mobile structure implemented with an assisted navigation system in accordance with an embodiment of the disclosure.
Figure 6:
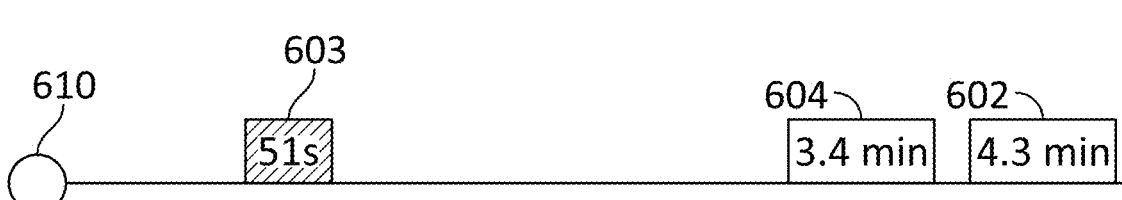

FIG. 6 illustrates an exemplary collision decluttering display 600 that controls collision decluttering for a mobile structure 601 implemented with assisted navigation system 100 in accordance with an embodiment of the disclosure. Urgent stationary vessels 602 are highlighted, in one example, with a circular marker (fixed number of pixels, independently of zoom). Urgent moving vessels 603 and 604 have a line 606 connecting their current position to their future position 608 which shown as a colored circle. Controller 130 utilizes a timeline 610 where forward projections shown on the navigational chart are referenced on the timeline and where the scale of the timeline is operational context-dependent. The pilot may select a timeline object and get more detail about that object. For example, to reveal the inflation region which is used to compute the risk. To control clutter, vessel 612 that is not identified as urgent may not have timeline a marker. In the display, when another vessel is ahead of the mobile structure 101, a marker is shown above the timeline, where a target is behind the mobile structure 101, the marker is shown below the timeline.

Controller 130 utilizes a concept of a target range to limit processing bandwidth, i.e., the multifunction display may not be able to process all targets in the world to see whether they are potentially a threat. Thus, controller 130 utilizes a target range large enough that does not need user configuration and the that the pilot, for example 20 Nm, which corresponds to the range of radar and AIS. Projecting targets with constant velocity (speed and heading) is reasonable in open water but problematic in a curving channel where it is likely that the vessel will follow the channel. Where there is a curving channel, controller 130 utilizes constant velocity projection.

Regarding operational context, passing clearances and urgency are different between, for example, the English Channel and, for example, the River Hamble because the operational context is not the same. In accordance with the illustrative embodiments, operational context is a continuum between inshore (zero, 0) and offshore (one, 1), so the River Hamble would be fully inshore, the English Channel would be fully offshore, and the Solent strait would be somewhere between the inshore and outshore (e.g., one-half, 0.5). In the illustrative embodiments, operational context may be computed from the densities of depth soundings and/or marks.

With regard to depth soundings, in some embodiments, live tidal height data may be integrated with bathymetric charts to identify safe regions and distinguish PAD zones with increased accuracy. In some embodiments, depth soundings may be of purely cartographic origin and/or may be supplemented by data gathered over time from a boat's own echo sounder.

Figure 7:
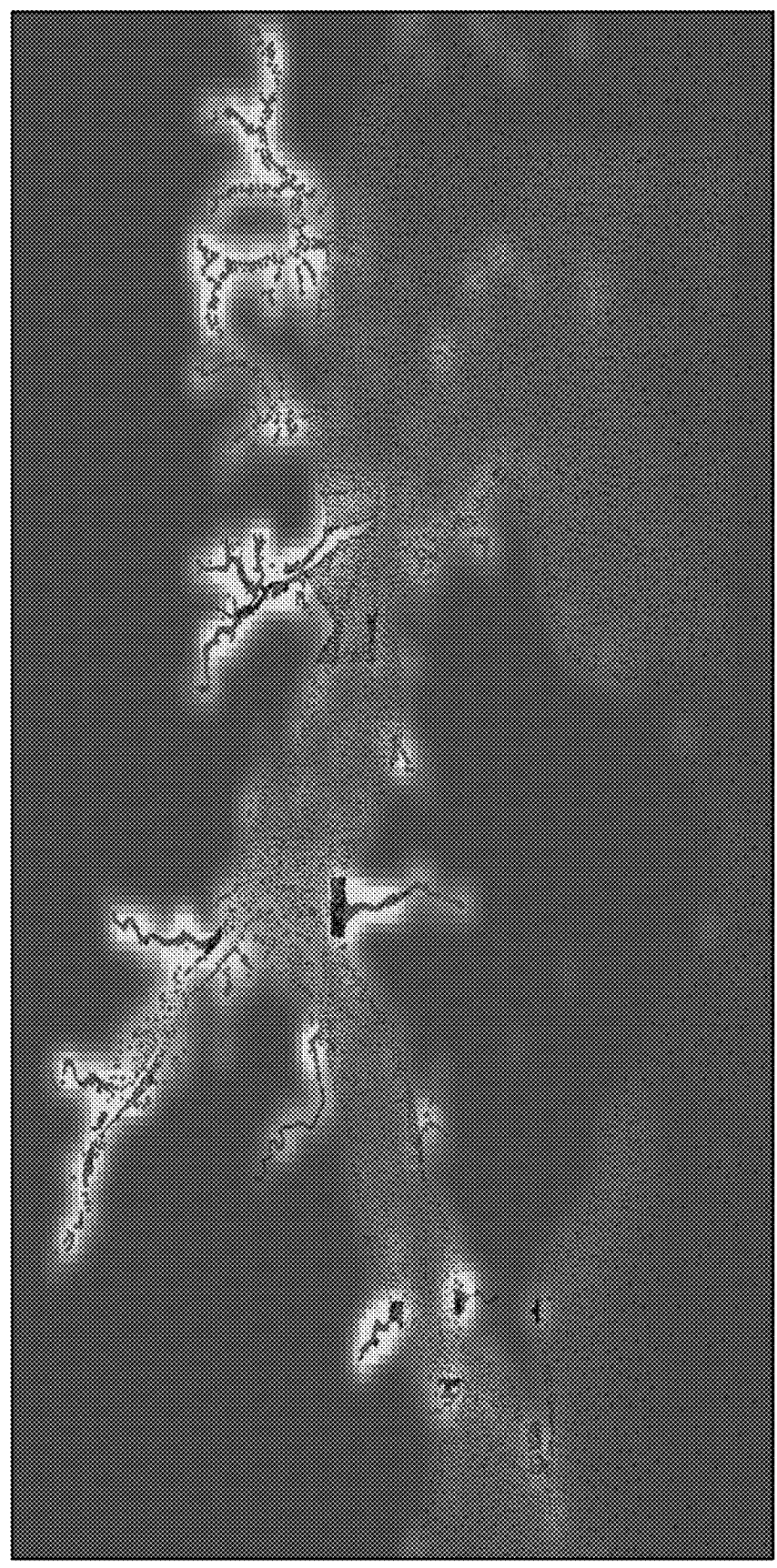
FIG. 7 illustrates an exemplary heat map illustrating an exemplary operational context in accordance with an embodiment of the disclosure.

Using histogram binning and applying filtering so operational context changes smoothly, the resulting operational context may be visually inspected for accuracy using heat maps like such as that depicted in FIG. 7. FIG. 7 illustrates an exemplary heat map 700 illustrating an exemplary operational context in accordance with an embodiment of the disclosure. In some embodiments, such heat maps may be time dependent (e.g., some navigational hazards may be time dependent such as scheduled passenger routes that are only active during certain hours or in accordance with predetermined timetables).

Figure 8:
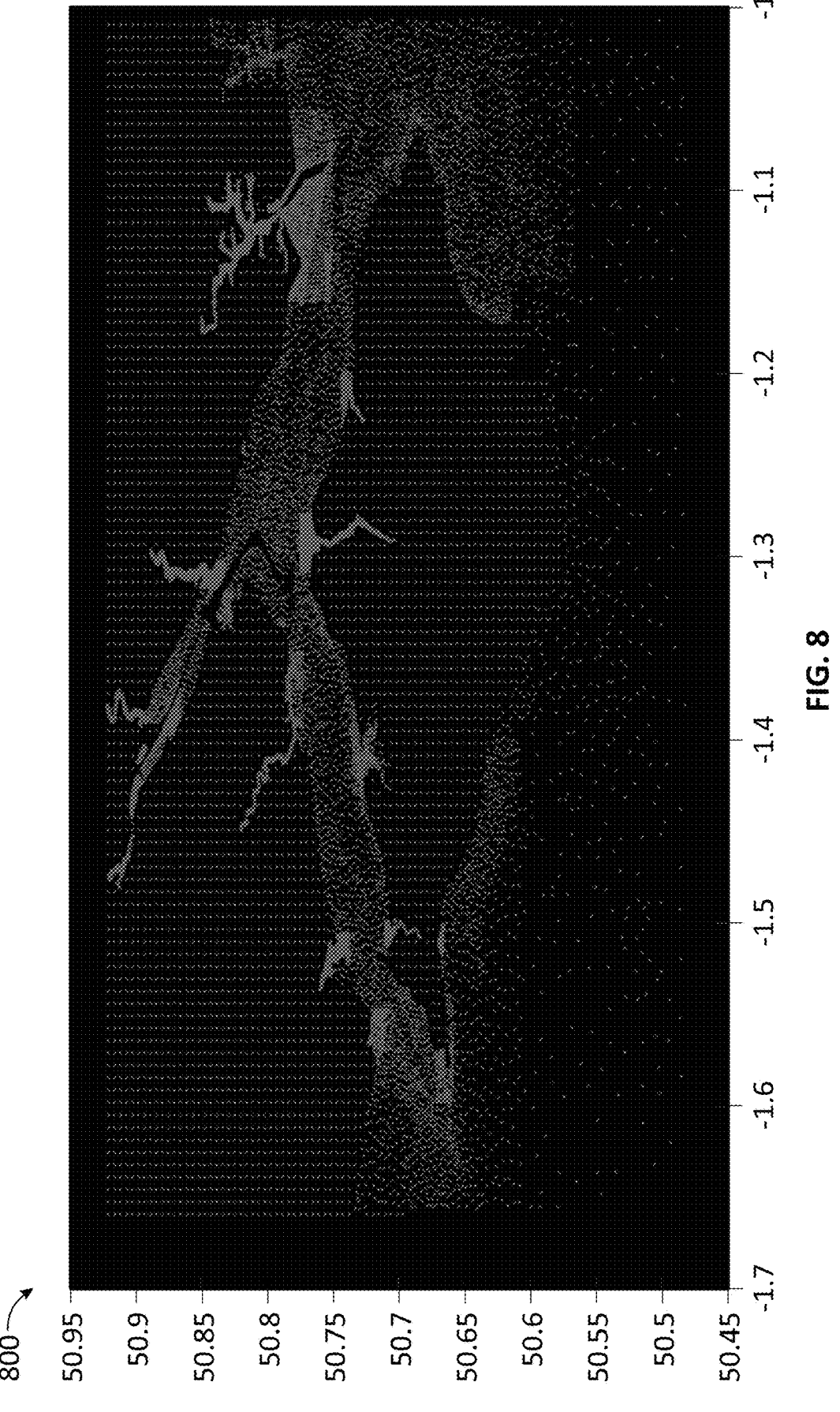
FIG. 8 illustrates a map of sounding points with land soundings in accordance with an embodiment of the disclosure.
Figure 9:
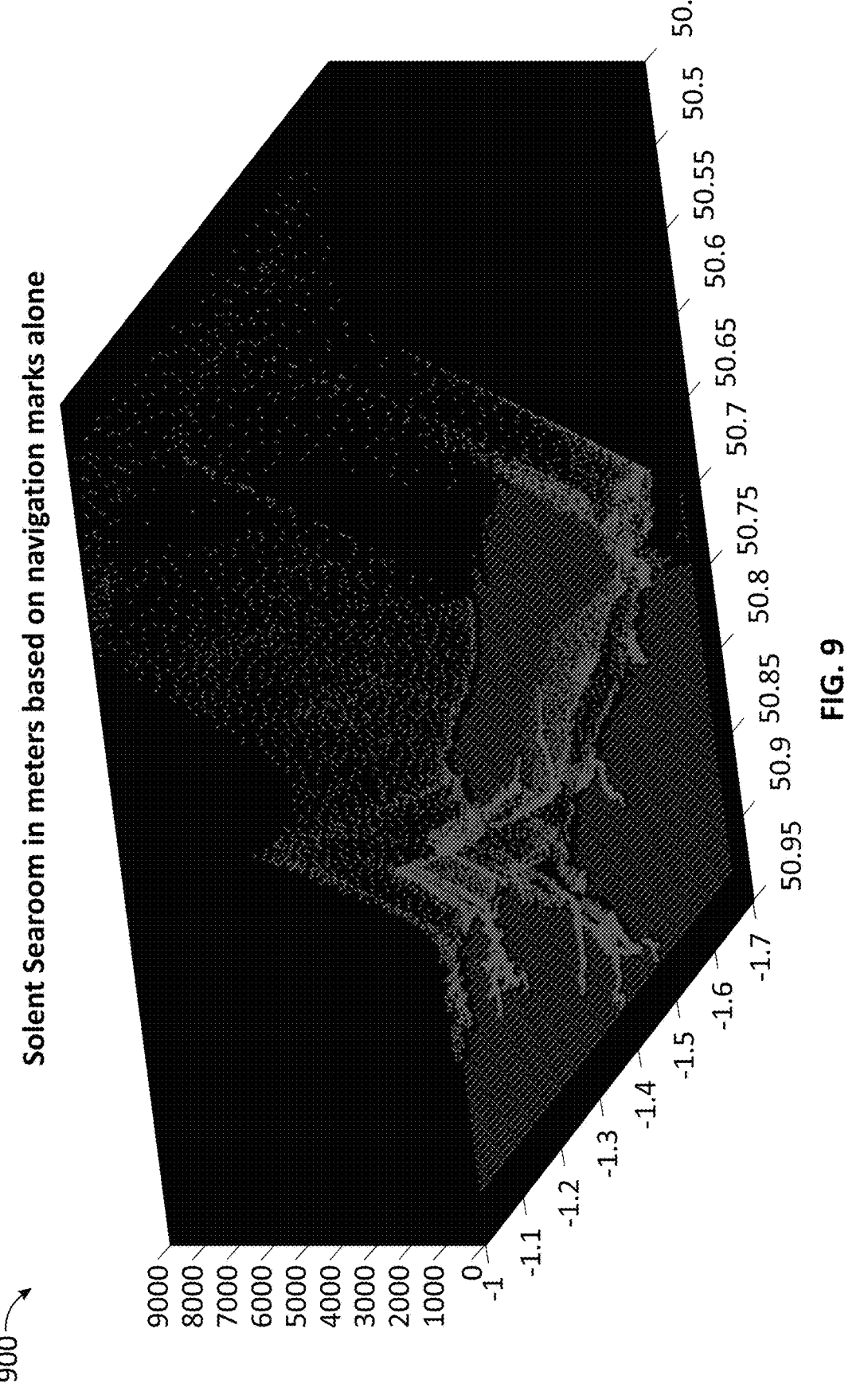
FIG. 9 illustrates a map of the Solent strait viewed from the Northwest looking Southeast in accordance with an embodiment of the disclosure.
Figure 10:
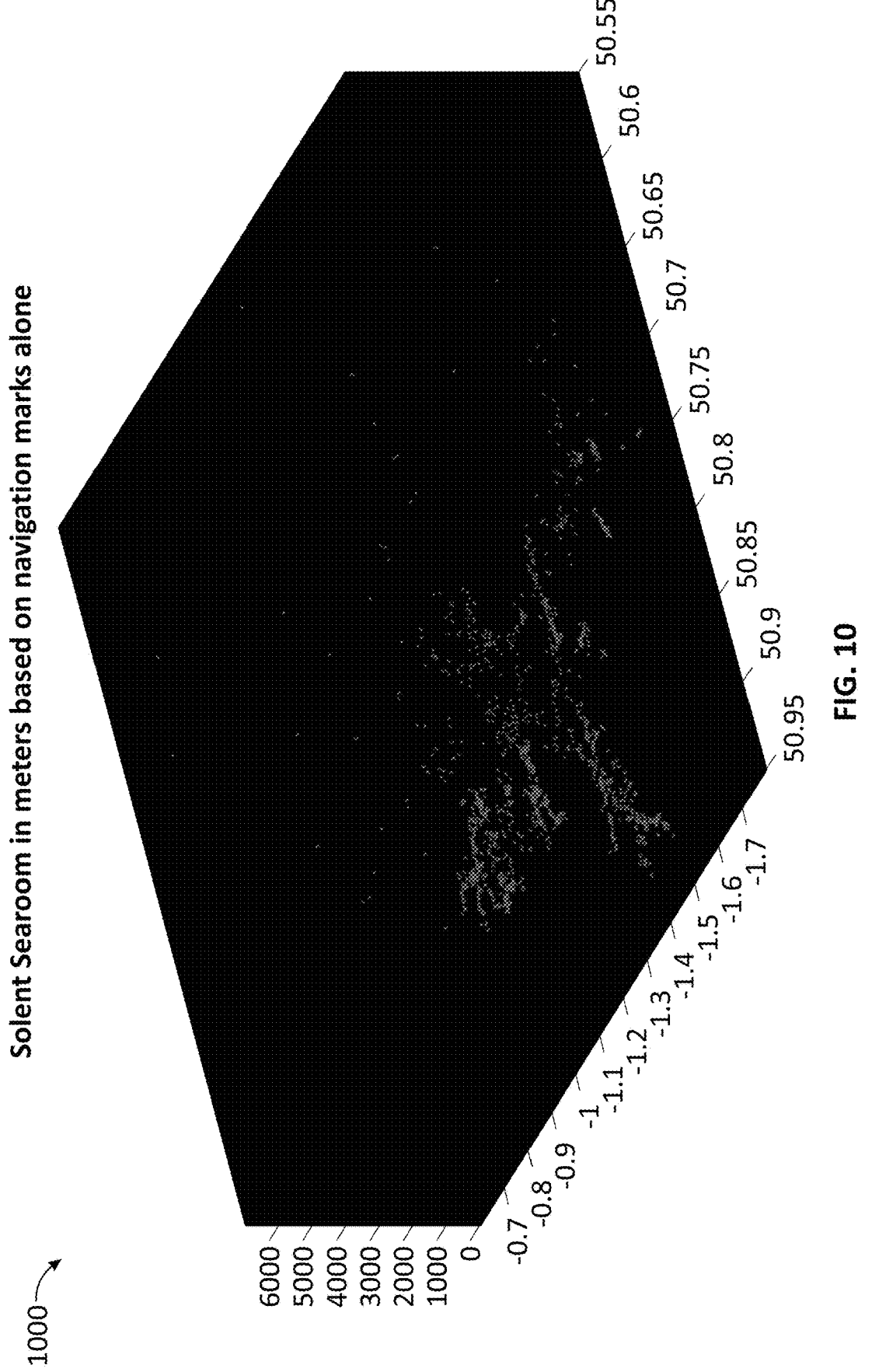
FIG. 10 illustrates a map of the Solent strait viewed from the Northwest looking Southeast further illustrating wide spaced marks on the South side of the Isle of Wight and closely spaced marks around the rivers of the mainland in accordance with an embodiment of the disclosure.

However, it is useful to have a metric value for Searoom (maneuvering distance expressed in meters), so controller 130 initially determines Searoom and then converts the Searoom into operational context. Controller 130 determines the Searoom by taking soundings points and add land soundings (at any height above sea level) if land heights have not been provided by a data provider. FIG. 8 illustrates a map 800 of sounding points with land soundings in accordance with an embodiment of the disclosure. For each sounding point, controller 130 determines a linear distance to all shallows (depth below a threshold) in range (the maximum Searoom range, typically a few NM). The depth-based constraint is the smallest of these distances. FIG. 9 illustrates a map 900 of the Solent strait viewed from the Northwest looking Southeast in accordance with an embodiment of the disclosure. For each constraining mark point (lateral & cardinal marks), controller 130 determines a linear distance to all other marks within range. The mark-based constraint at that mark is the smallest of these distances. FIG. 10 illustrates a map 1000 of the Solent strait viewed from the Northwest looking Southeast further illustrating wide spaced marks on the South side of the Isle of Wight and closely spaced marks around the rivers of the mainland in accordance with an embodiment of the disclosure.

Figure 11:
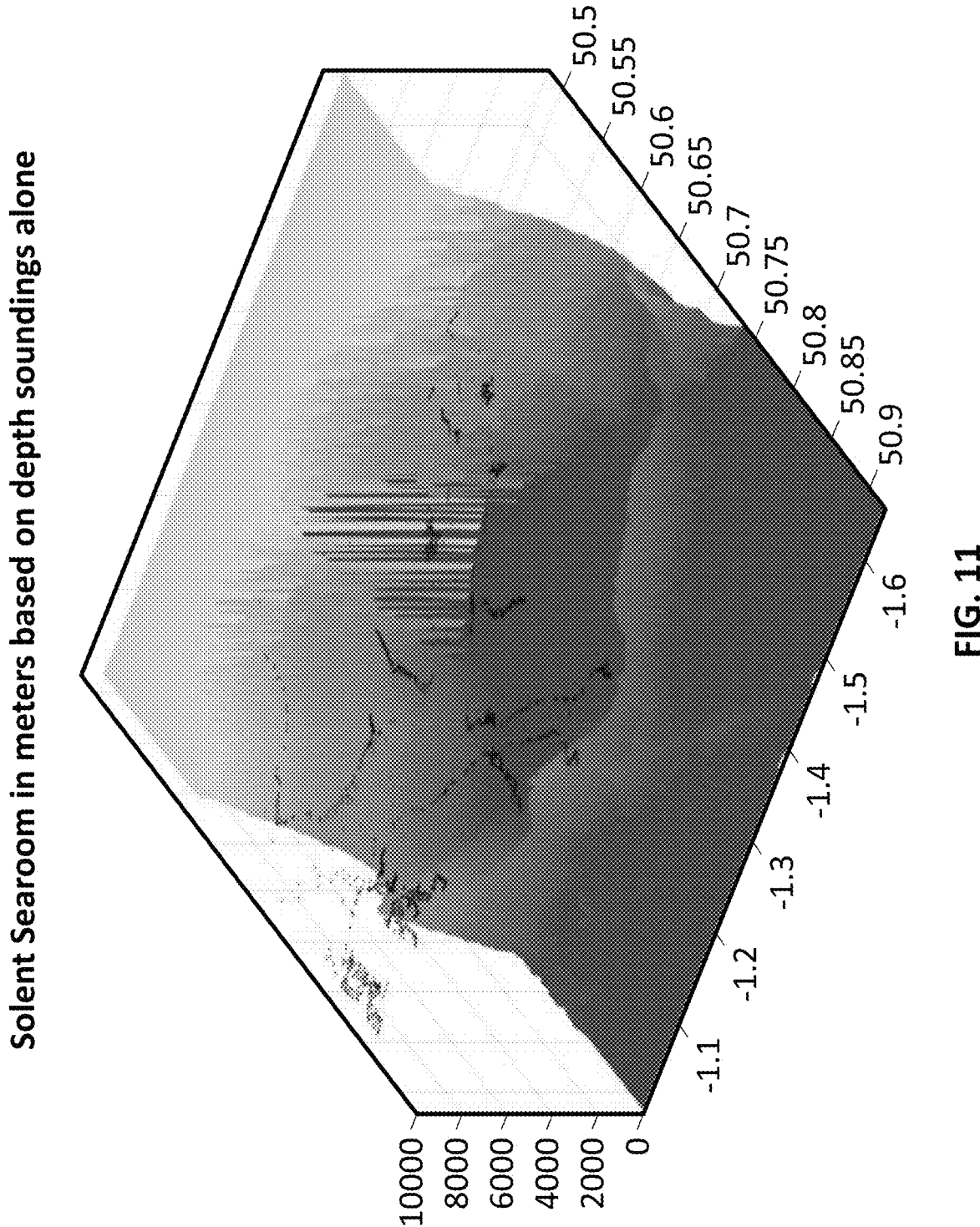
FIG. 11 illustrates a map of the Solent strait Searoom in meters based on depth sounding alone in accordance with an embodiment of the disclosure.
Figure 12:
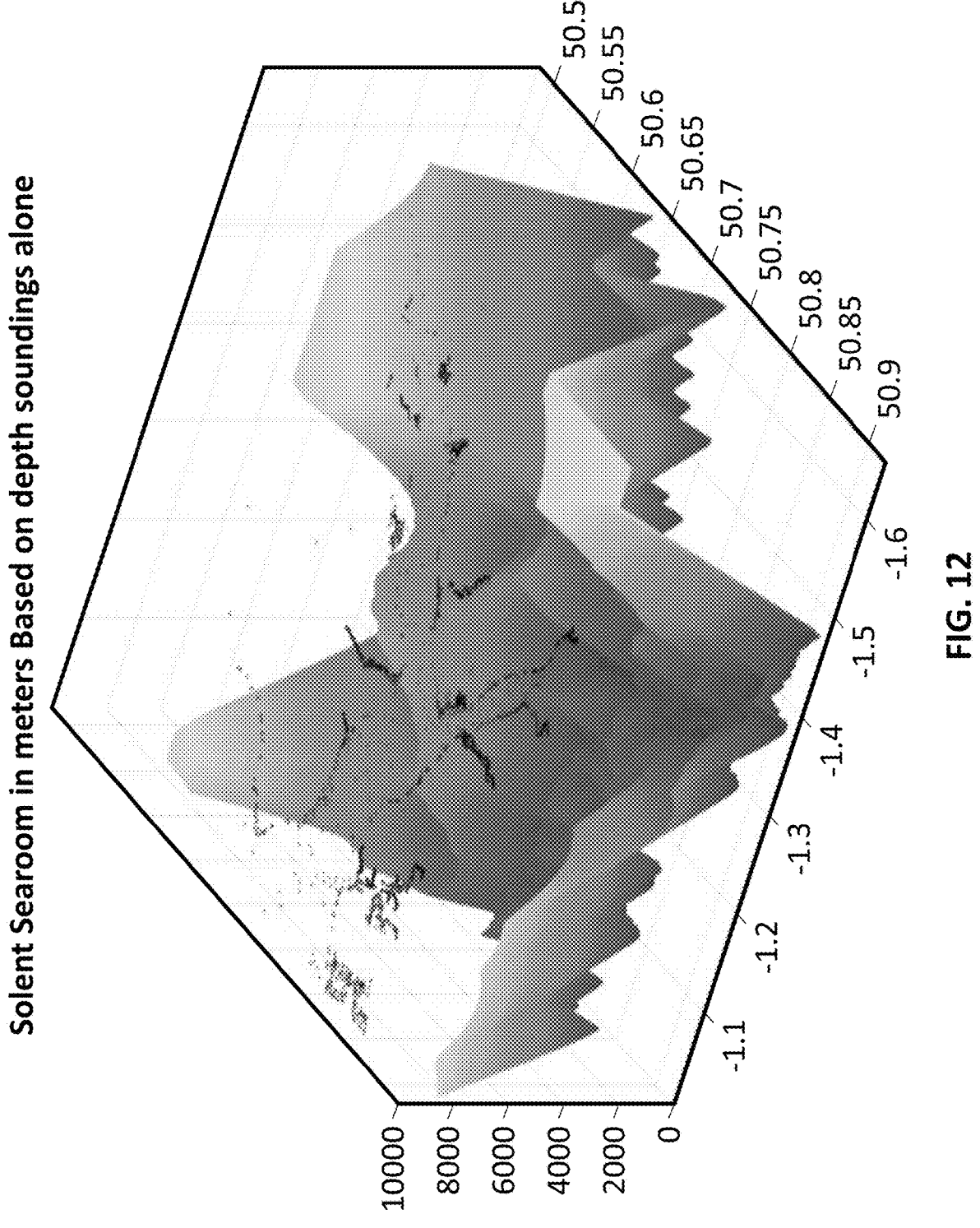
FIG. 12 illustrates a map of the Solent strait Searoom in meters based on navigation marks alone in accordance with an embodiment of the disclosure.
Figure 13:
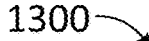
FIG. 13 illustrates a map of the Solent strait Searoom in meters based on navigation marks and depth sounding in accordance with an embodiment of the disclosure.

These maps are designed to be predetermined and validated but a deployed system will need Searoom at any latitude and longitude not just at marks or soundings, so a set of points is not useful. Therefore, the next step is for controller 130 to convert the sounding-based constraints and mark-based constraints to a map using two-dimensional curve fitting (linear interpolation, or nearest neighbor). FIG. 11 illustrates a map 1100 of the Solent strait Searoom in meters based on depth sounding alone in accordance with an embodiment of the disclosure. FIG. 12 illustrates a map 1200 of the Solent strait Searoom in meters based on navigation marks alone in accordance with an embodiment of the disclosure. In accordance with the illustrative embodiments, the Searoom is the smallest of the mark and depth constraint maps (minimum surface height). Therefore, FIG. 13 illustrates a map 1300 of the Solent strait Searoom in meters based on navigation marks and depth sounding in accordance with an embodiment of the disclosure.

Figure 14:
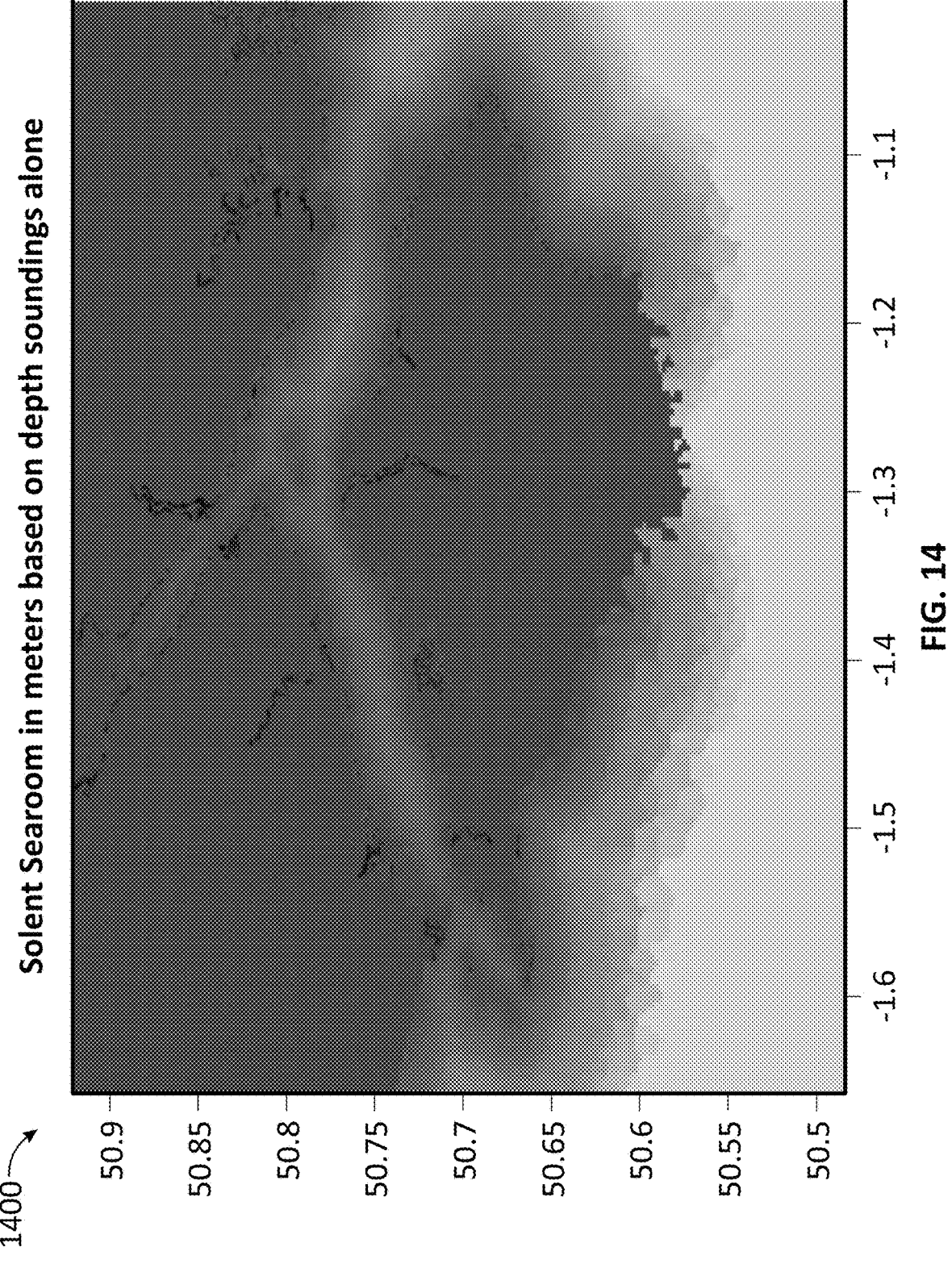
FIG. 14 illustrates a map of the Solent strait Searoom in meters based on depth sounding alone in accordance with an embodiment of the disclosure.
Figure 15:
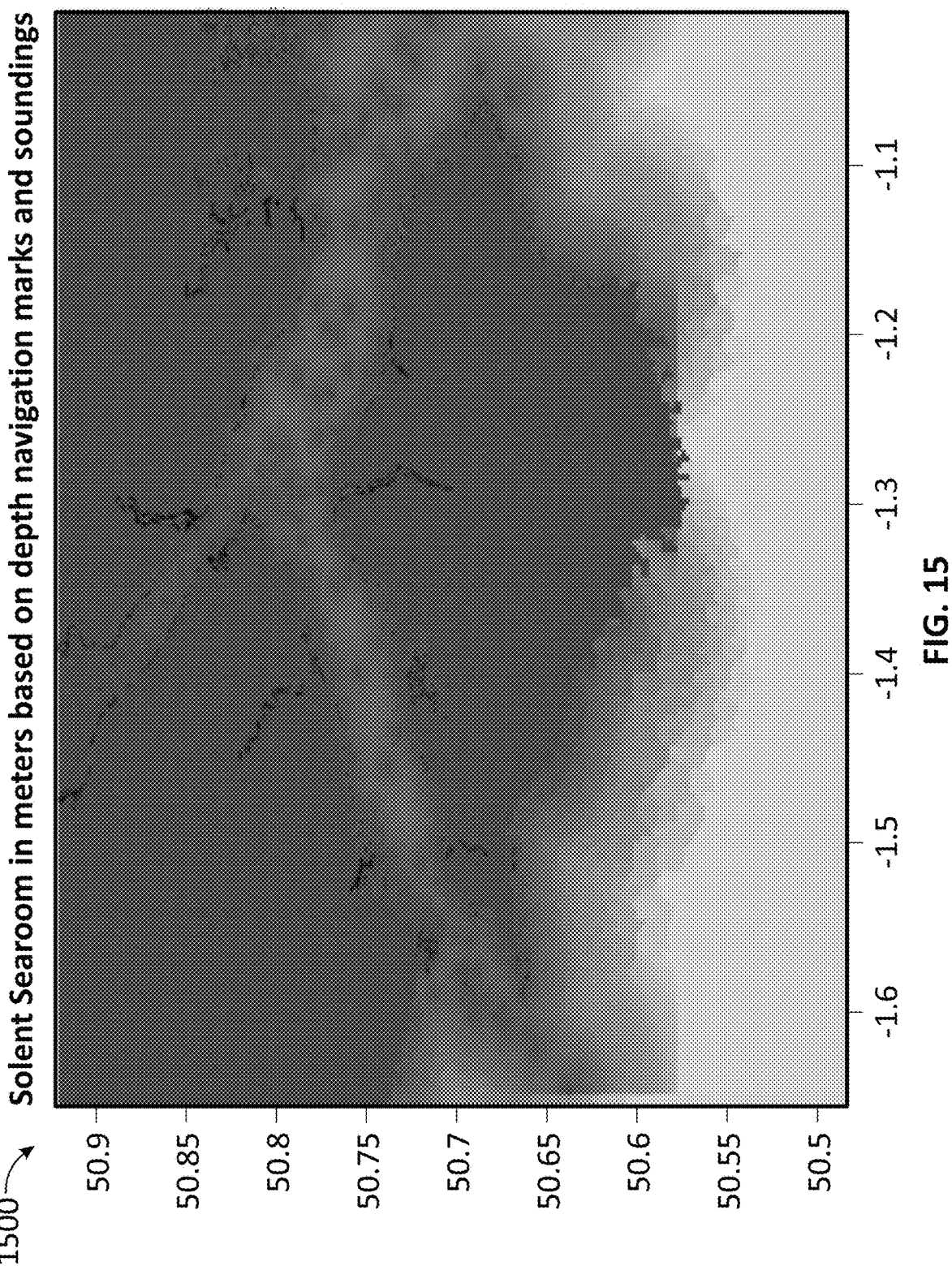
FIG. 15 illustrates a map of the Solent strait Searoom in meters based on navigation marks and depth sounding in accordance with an embodiment of the disclosure.

Viewing these maps from the top (as heat maps) illustrates subtle differences when the mark-based constraints are included, with the Eastern Solent strait which is wide and deep, becoming relatively constrained due to marks. FIG. 14 illustrates a map 1400 of the Solent strait Searoom in meters based on depth sounding alone in accordance with an embodiment of the disclosure. FIG. 15 illustrates a map 1500 of the Solent strait Searoom in meters based on navigation marks and depth sounding in accordance with an embodiment of the disclosure. In some parts of the world, marks have an even greater impact than in the Solent strait.

Figure 16:
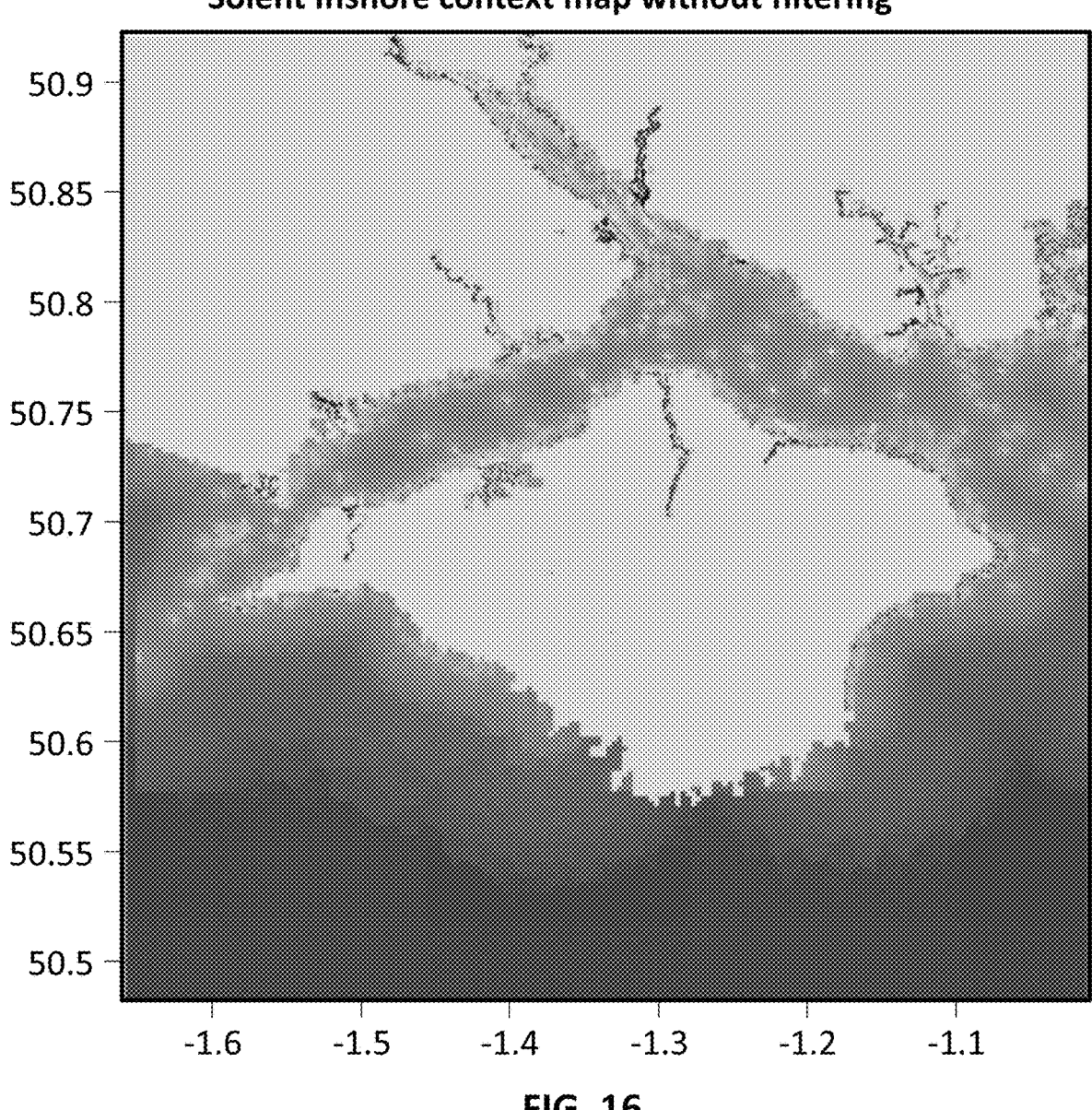
FIG. 16 illustrates an operational context map of the Solent strait inshore in meters without filtering in accordance with an embodiment of the disclosure.
Figure 17:
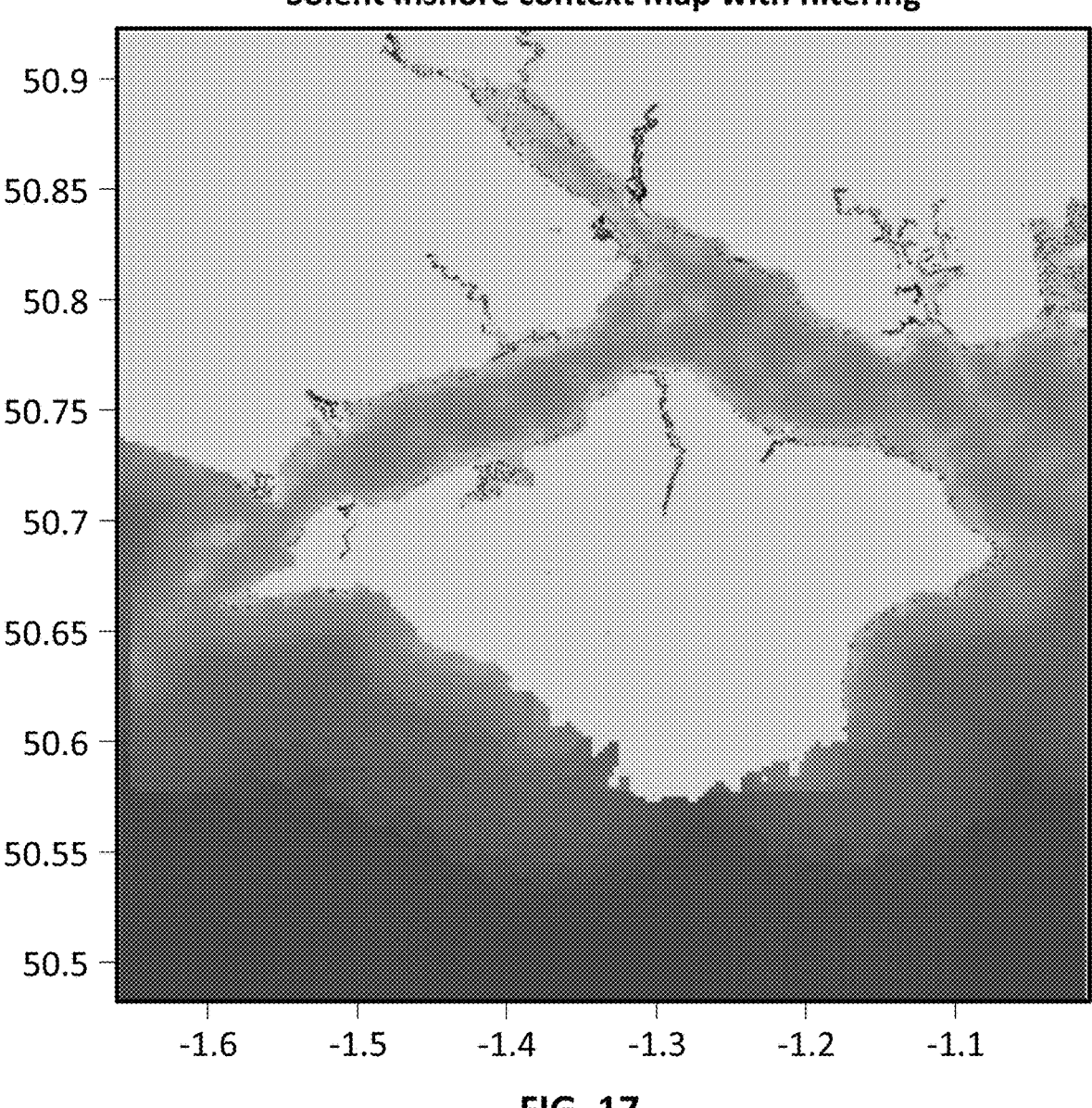
FIG. 17 illustrates an operational context map of the Solent strait inshore in meters with filtering in accordance with an embodiment of the disclosure.

To convert to operational context, controller 130 identifies a fully inshore operational context as one (Context.Inshore=1) when the Searoom is less than a minimum threshold (50 m) and fully offshore operational context as zero (Context.Inshore=0) when the Searoom exceeds a maximum threshold (typically a few NM), with the operational context varying more logarithmically than linearly with Searoom. FIG. 16 illustrates an operational context map 1600 of the Solent strait inshore in meters without filtering in accordance with an embodiment of the disclosure. Since operational context should change gradually rather than suddenly, controller 130 applies spatial filtering such as image closing or moving median. FIG. 17 illustrates an operational context map 1700 of the Solent strait inshore in meters with filtering in accordance with an embodiment of the disclosure.

Operational context drives sensitivity to proximity and urgency. For example, in the English Channel, 10 minutes warning of 1 Nm proximity to a tanker may be preferred, whereas, in the River Hamble, regularly 50 m from other pleasure craft warning may be preferred. Searoom is fine-tuned based on proximity, where there is a rule of thumb that a vessel may pass halfway between another vessel and a navigation limit. Additionally, the operational context may be watercraft type dependent, i.e., whether the watercraft is a large freighter, small sailboat, etc. Further, operational context drives zoom level, where offshore more elevation and a longer-range view may be preferred opposed to inshore. Controller 130 provides automating the zoom setting to save user input.

Figure 18:
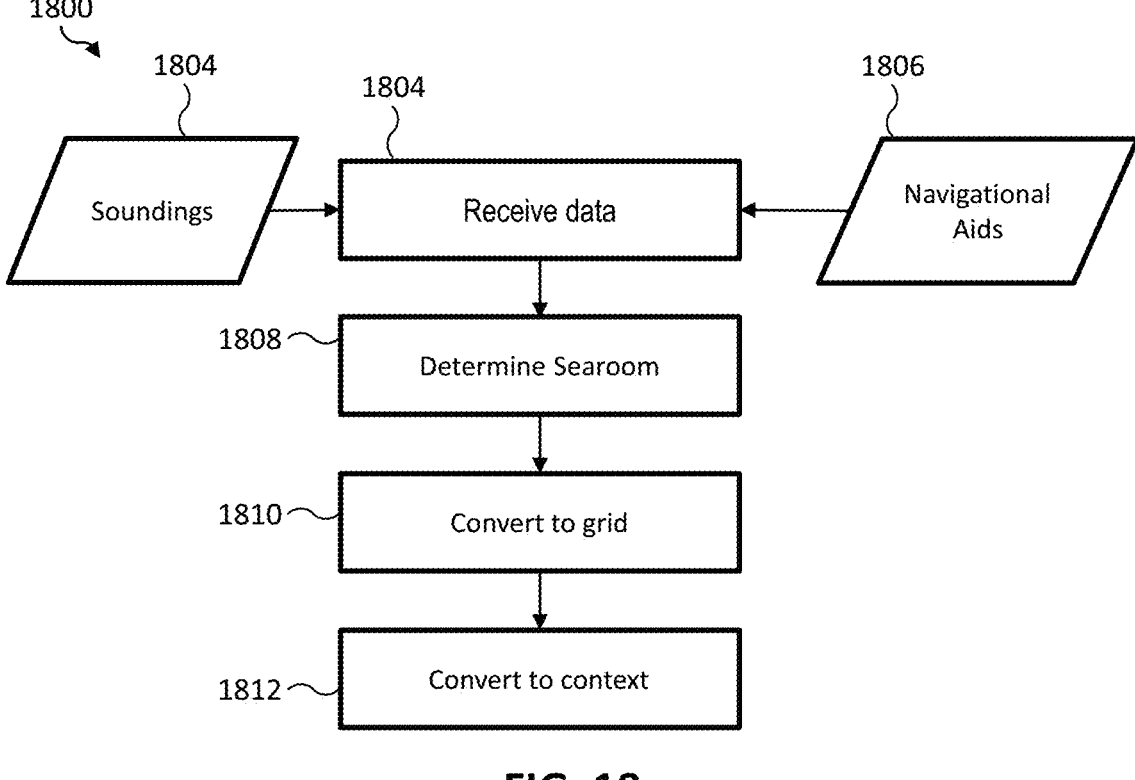
FIG. 18 illustrates a flow diagram of a process providing an operational context mapping for a mobile structure implemented with an assisted navigation system in accordance with an embodiment of the disclosure.

FIG. 18 illustrates a flow diagram of a process 1800 providing an operational context mapping for mobile structure 101 implemented with assisted navigation system 100 in accordance with an embodiment of the disclosure. In block 1802, controller 130 receives sounding data 1804 that provides latitude and longitude sets of points with associated depths and navigational aids 1806 identifying mark points and types of marks. In block 1808, controller 130 determines a Searoom by establishing distances in meters from each latitude and longitude to the nearest constraint i.e., non-navigable sounding or nearest constraining mark (e.g., port/starboard/cardinal/danger but not special marks). In block 1810, controller 130 converts the Searoom to a grid by interpolation to form a Searoom 'heatmap' based on a latitude and longitude evenly spaced grid. In block 1812, controller 130 converts the determined grid to operational context by converting the Searoom in meters to operational context on a scale from 0-1. Thus, controller 130 creates separate Searoom grids for navigational aids and soundings, then fuses the grids together.

Regarding detecting possible collisions, in the illustrative embodiments, urgency may be classified into urgency levels, such as 'Potential, Imminent, and Not Urgent'. Controller 130 marks up those vessels considered to be Potential or Imminent, with only Imminent targets causing controller 130 to generate alarms (see later section). Controller 130 identifies urgency levels for each vessel based on intercept time and operational context differently for inshore versus offshore as follows:

| Inshore Object Types | Potential | Imminent |
|---|---|---|
| Floating mark/buoy | 1 | .5 |
| Fixed mark | 1 | 0.5 |
| Shallows or rocks | 1 | 0.3 |
| Stationary Class B | 1 | 0.5 |
| Moving Class B | 2 | 1 |
| Stationary Class A | 3 | 1.5 |
| Moving Class A | 6 | 3 |

| Offshore Object Types | Potential | Imminent |
|---|---|---|
| Floating mark/buoy | 2 | 1 |
| Fixed mark | 2 | 1 |
| Shallows or rocks | 2 | 1 |
| Stationary Class B | 2 | 1 |
| Moving Class B | 4 | 2 |
| Stationary Class A | 6 | 3 |
| Moving Class A | 12 | 6 |

Controller 130 may present any alarms either visibly on screen; audibly via tone-based alarms based on fused data from cameras/AIS/charts/radars; verbally through the MFD along the lines 'vessel approaching on starboard bow'; or by audible alarms through loud hailer to warn other vessels directly. In various embodiments, the urgency levels may be user adjustable such that a veteran pilot may not need as much time to react to a navigational hazard as a novice pilot who may need more reaction time.

Controller 130 may also utilize object size inflation to identify predicted areas of danger (PAD) existing around all objects. Controller 130 may inflate object size using a PADinflation_m parameter as follows:

| Inshore Object Types | AllRound | AheadPerKnot |
|---|---|---|
| Floating mark/buoy | 5 | 0 |
| Fixed mark | 25 | 0 |
| Shallows or rocks | 40 | 0 |
| Stationary Class B | 20 | 0 |
| Moving Class B | 30 | 10 |
| Stationary Class A | 100 | 0 |
| Moving Class A | 200 | 40 |

| Offshore Object Types | AllRound | AheadPerKnot |
|---|---|---|
| Floating mark/buoy | 10 | 0 |
| Fixed mark | 50 | 0 |
| Shallows or rocks | 50 | 0 |
| Stationary Class B | 100 | 0 |
| Moving Class B | 200 | 20 |
| Stationary Class A | 400 | 0 |
| Moving Class A | 1000 | 70 |

Marks may have zero effective size, so their PAD is an inflation radius PADinflation_m. Sandbanks have a size defined by the navigational chart, the keel depth and the tide height and are inflated by the appropriate PADinflation_m. Stationary vessels may have known dimensions and if the vessel heading is known then its PAD can be computed by inflating these dimensions. For moving vessels course over ground (COG) may replace heading if a heading is not known. For vessels without known dimensions, class B vessels are assumed to be 20 m×5 m and class A vessels are assumed to be 300 m×70 m and these dimensions are also inflated. There are two PAD inflation tables relating to the extremes of operational context (inshore and offshore) and these should be interpolated according to the current operational context.

Figure 19:
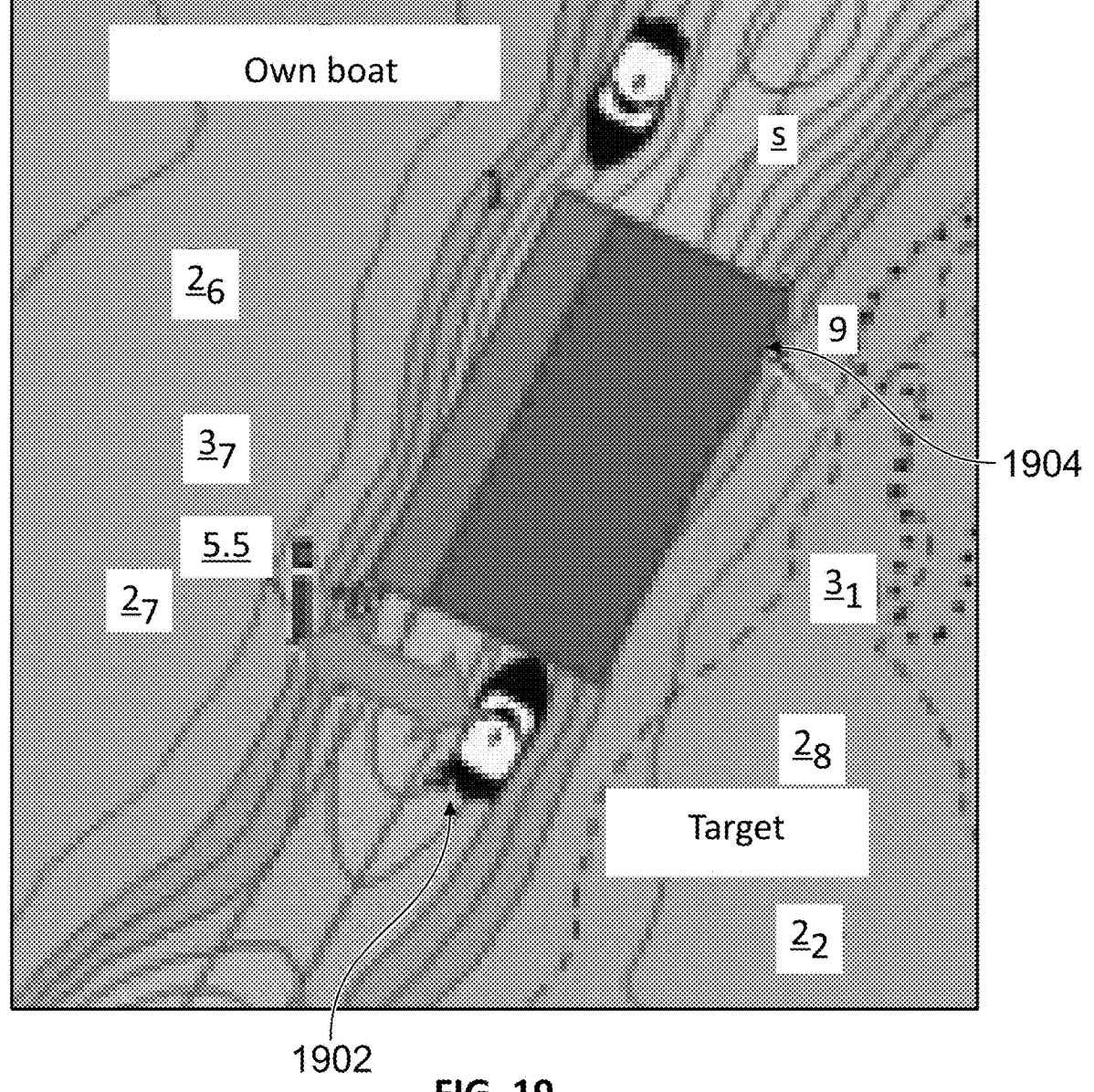
FIG. 19 illustrates one example where a vessel (target) is 100 meters from a post in accordance with an embodiment of the disclosure.

For vessels, the AllRound PADinflation_m parameter may be reduced in narrow channels. A rule of thumb is that a vessel may pass halfway between another vessel and a navigational restriction. The navigational restriction may be a channel mark, cardinal mark, shallow patch, etc. FIG. 19 illustrates one example where a vessel (target) 1902 is 100 meters from post 1904 in accordance with an embodiment of the disclosure. Thus, controller 130 utilizes an AllRound PADinflation_m of 50 meters. At bends in a channel, controller 130 projects the path of a target around the channel utilizing an inherent reduction in Urgency thresholds for classification (as shown in the tables above) to prevent false alarms in narrow channels.

Figure 20:
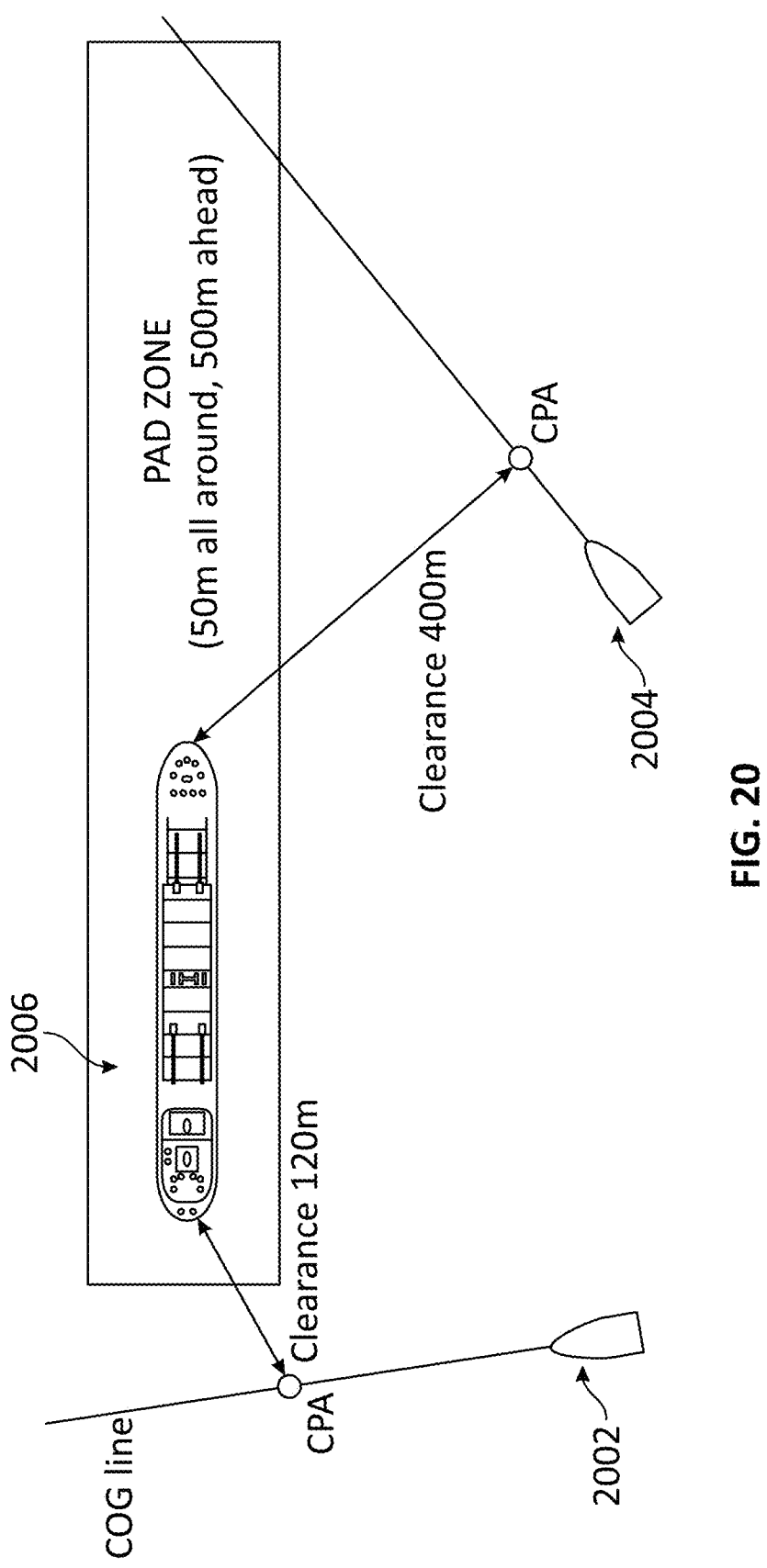
FIG. 20 illustrates clearance margins for two vessels in relation to a moving container ship in accordance with an embodiment of the disclosure.

There is risk of hitting a target if maintaining the current course, which may also be referred to as a heading, COG, etc. (and for moving targets, speed) is high if the clearance margin is low. In accordance with the illustrative embodiment, this clearance margin may be defined as the ratio between the clearance to the PAD inflation. For example, if mobile structure 101 is looking to pass 15 meters away from a fishing float with a 5-meter inflation region, then controller 130 identifies a clearance margin of (15–5)/5=2 meters. If mobile structure 101 is passing 1500 meters in front of a tanker with a 1000-meter inflation region, then controller 130 identifies a clearance margin of (1500–1000)/1000=0.5 meters. FIG. 20 illustrates clearance margins for two vessels 2002 and 2004 in relation to a moving container ship 2006 in accordance with an embodiment of the disclosure. For vessel 2002, which is passing behind the moving container ship 2006, the clearance margin passing behind is 120/50=2.4 meters whereas, for vessel 2004, which is passing in front of the moving container ship 2006, the clearance margin passing in front is 400/500=0.8 meters, i.e., less than one meter. A clearance margin below 1 is risk and should generate an alarm when the urgency is imminent. Controller 130 utilizes different colors for different clearance margin of the vessel's markups, with colors changing from green through orange to red as the clearance margin reduces from 5 meters to 0 meters with a clearance margin less than 1 meter showing red.

Risk is related to time to a potential danger situation. PAD zones are existing Raymarine AIS functionality, which applies the torpedo targeting principle to determine Predicted Area of Danger (PAD). In the general case, the quadratic intercept equation which Raymarine uses for existing AIS PAD zones produces two possible intercept results: one corresponding to running into a vessel and the other to being run down from behind. These two intercept times create long PAD zones which pollute a displayed navigational chart and, since both are not possible simultaneously, display navigational chart pollution is unwarranted. Furthermore, there is a problem with current implementations where the intercept decision may be changed late—simulation in ideal conditions with constant velocities show intercept arising at the last minute, when the intercept was not predicted ahead of time.

Conventional high-seas maritime equipment uses CPA (closest point of approach) and TCPA (time of closest point of approach) rather than the torpedo quadratic equation and Assisted navigation system 100 uses TCPA to produce the intercept time, eliminating the quadratic equation and its associated problems. Using assisted navigation system 100, tolerance is applied to relative velocities (speed and heading may change by a certain amount) so that the TCPA is the minimum of a set of potential TCPAs which take account of potential maneuvering.

Additionally, controller 130 may use Kalman filters for sensor fusion. Information from multiple sensors is blended with weights chosen according to the error and noise statics of the sensors and the geometry of the current setup. Noise in position estimation from camera-based CNN systems is high and so a Kalman filter will attenuate the blending of this channel, especially in the range direction where uncertainty is especially high but none the less, noise will propagate.

Figure 21:
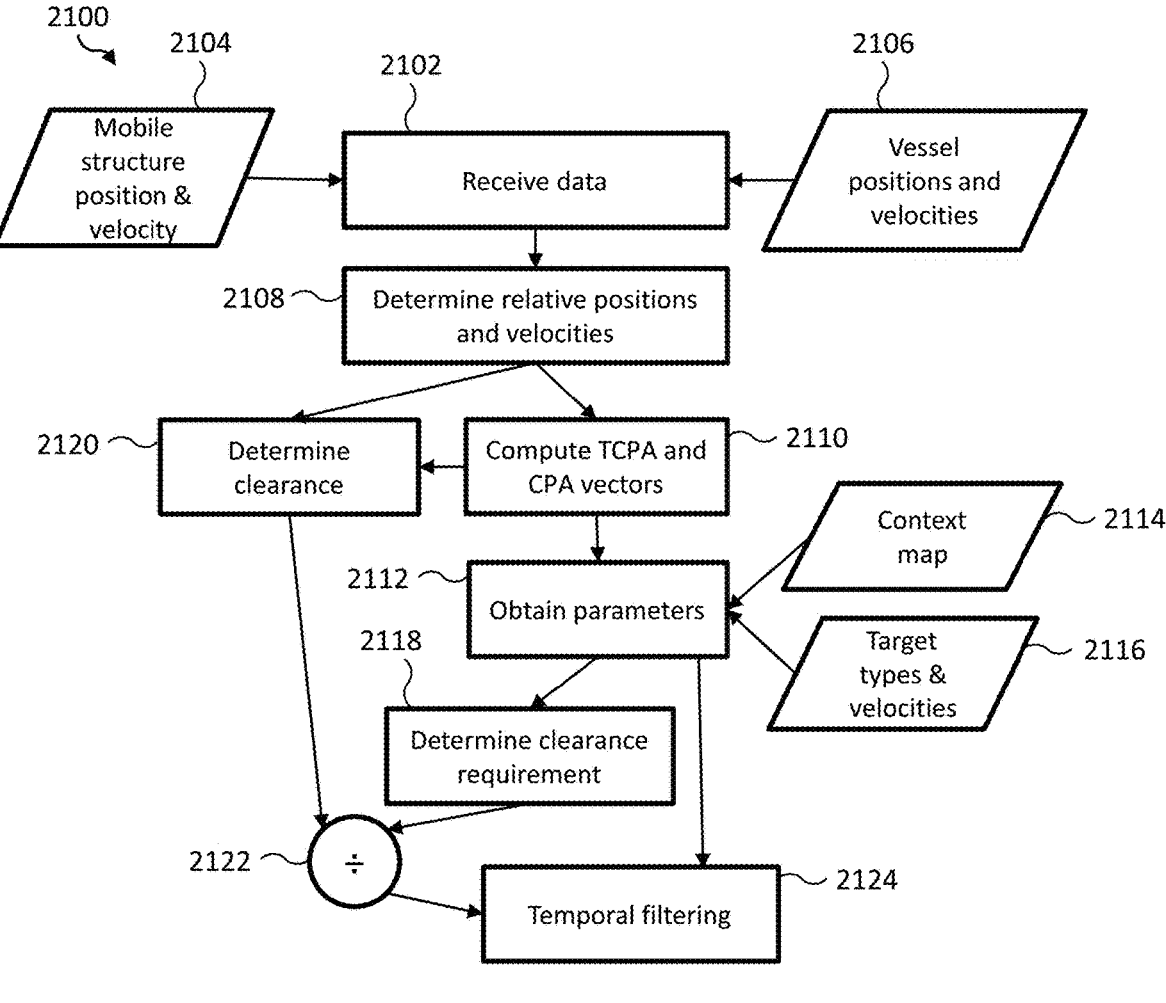
FIG. 21 illustrates a flow diagram of a process for detecting possible collisions associated with a mobile structure implemented with an assisted navigation system in accordance with an embodiment of the disclosure.

FIG. 21 illustrates a flow diagram of a process 2100 for detecting possible collisions associated with mobile structure 101 implemented with assisted navigation system 100 in accordance with an embodiment of the disclosure. In block 2102, controller 130 receives mobile structure data 2104 about mobile structure 101, i.e., boat position, velocity, etc. from onboard GPS, and vessel data 2106 about the positions and velocities of vessels coming from data fusion of AIS, radar, navigational charts, etc. Marks having zero velocity are also target vessels. In block 2108, controller 130 determines relative positions and velocities by subtracting a vector of mobile structure 101 from each of the relative positions and velocities of the target vessels. In block 2110, controller 130 determines TCPA and CPA vectors, each relative velocity is projected in time to achieve time to closest point of approach and closest point of approach vectors. In block 2112, controller 130 obtains assisted navigation system 100 parameters, i.e., obtains the inflation in meters from an operational context map 2114, as previously described, and urgency in seconds for each target from target types and velocities, as is also previously described. Controller 130 may achieve this from lookup table interpolation. In block 2118, controller 130 determines clearance requirement dependent on orientation and direction of travel based on the obtained parameters in block 2112 and, in block 2120, determines the clearance based on the determined relative positions and velocities of block 2108 as well as the determined TCPA and CPA vectors of block 2110. In block 2122, controller 130 determines the ratio of the actual clearance from block 2120 to the clearance requirement from block 2118. In block 2124, controller 130 applies temporal filtering to all outputs.

Regarding smart alerting, i.e., reduce a false alarm rate for mobile structure 101, controller 130 produces an alarm in situations identified as urgent and risky. That is, controller 130 generates an alarm when clearance margin is, for example, less than 1 and the urgency is identified as imminent. That is, in current systems, alarms may be turned off by pilots if false alarms are frequent. Thus, controller 130 identifies a situation that persists before triggering an audible alarm. For example, controller 130 considers that the clearance margin is, for example, less than 1 and the urgency is identified as imminent as persistent for 10% of the relevant imminent classification time. Controller 130 considers any alarm cancelation by the pilot as semi-permanent, i.e., there should be no time windows after which alarms are reactivated. However, if an alarm has been cancelled by the pilot of mobile structure 101 (e.g., due to shallow depth or shallows ahead), controller 130 reactivates the alarm automatically when the depth exceeds a predetermined threshold again using a hysteresis window.

Regarding sensor fusion, controller 130 utilizes sensor that include but are not limited to AIS, radar, CNN/camera, GNSS/cartography, etc. Controller 130 fuses two or more of these sources so that an AIS transmitting vessel appearing on the radar and CNN is treated as a single target and not three targets. Thus, controller 130 deals with errors in position, conflicting classifications, flicker in target identification, etc., and self-calibrates the sensor offsets. Additionally, controller 130 utilizes cartography feeds as principally navigation marks and soundings and fuses marks with CNN and radar feeds. Controller 130 does not fuse shallows but, rather, combines shallows with target tracking output, which are fed to a danger detection and alert system.

In smart fusion, controller 130 performs target acquisition by following a rule (common to all trackers) about persistence of targets before revealing them to the pilot. To lower the FAR (false alarm rate), sensor fusion combines radar, AIS, CNN and navigational chart objects into a single object database and a dangerous situation needs to persist for some time before an alarm is sounded. Due to the polar nature of camera and radar sensors, the error standard deviations are different in range and azimuth. A radar measures range more accurately than azimuth, but a camera measures azimuth more accurately than range. Range is particularly hard for cameras with far-off objects, since their distance from the horizon may be just a few pixels, so knowing the horizon position becomes critical.

Controller 130 utilizes a sensor fusion toolbox that offers various ways of fusing, track level fusion seems tempting since our sensors produce tracks as output (AIS is effectively a track, CNN classifier produces tracks). For example, mobile structure 101 has several AIS recorded targets which have been processed to produce a ground truth from which simulated CNN observations have been generated, including noise and camera calibration error. The tracker needs an inertial cartesian reference frame, so controller 130 makes conversions from latitude/longitude/altitude (LLA), north/east/down (NED) and earth centered earth fixed (ECEF) which is the tracker reference frame.

Figure 22:
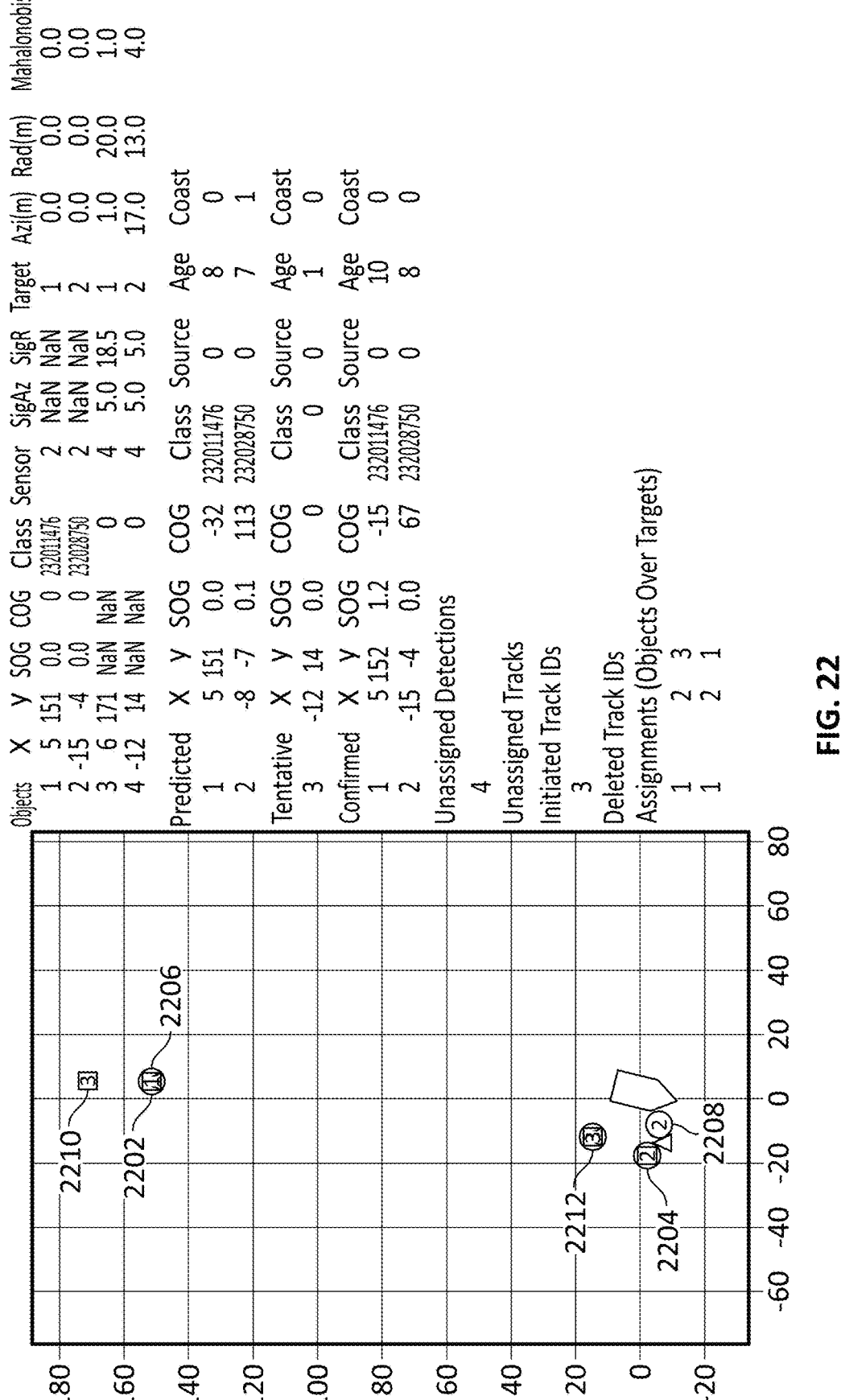
FIG. 22 illustrates an exemplary tracker for a mobile structure implemented with an assisted navigation system in accordance with an embodiment of the disclosure.

FIG. 22 illustrates an exemplary tracker 2200 for mobile structure 101 implemented with assisted navigation system 100 in accordance with an embodiment of the disclosure. In the example, there are two (red) AIS updates (objects 1 and 2) with position and velocity, with four CNN observations. Controller 130 utilizes sensor fusion to assign the two AIS observations 2202 and 2204 (red squares) to the matching Maritime Mobile Service Identity (MMSI) in the predicted tracks 2206 and 2208, respectively (black circles). Controller 130 further matches two CNN observations 2110 and 2113 (orange squares) are also matched to predicted tracks 2206 and 2208 (black circles) first by determining turning the measurement standard deviation into a covariance matrix in the ECEF coordinate system.

The standard deviations of the target measurements are camera dependent and in this example:

Object 3: Sigma_m.Azimuth (Sa): 5 Sigma_m.Range (Sr): 18

Object 4: Sigma_m.Azimuth (Sa): 5 Sigma_m.Range (Sr): 5

From which, controller 130 creates a covariance matrix following this reference:

$r11 = (Sr^* \cos d(\text{Azimuth\_deg}))^\wedge 2 + (Sa^* \sin d(\text{Azimuth\_deg}))^\wedge 2;$ $r22 = (Sr^* \sin d(\text{Azimuth\_deg}))^\wedge 2 + (Sa^* \cos d(\text{Azimuth\_deg}))^\wedge 2;$ $r12 = 0.5^* \sin d(2^* \text{Azimuth\_deg})^* (Sr^\wedge 2 - Sa^\wedge 2);$ $\text{Cov\_ned} = [r11\, r12\, 0\, r12\, r22\, 0\, 0\, 0\, 1];$ Controller 130 changes from a NED reference frame into an ECEF reference frame as follows using an internal rotation matrix):

$Rned2ecef = fusion.internal.frames.ned2ecefrotmat(Boat.Lat, Boat.Lon);$ $\text{Cov\_ecef} = Rned2ecef * \text{Cov\_ned} * \text{transpose}(Rned2ecef);$ Controller 130 then uses this measurement noise along with the vector (d) from the measurement to the predicted track position to produce the Mahalanobis distance $MahalanobisDistance(row) = sqrt(transpose(d)^* inv(\text{Cov\_ecef}) * d);$ Finally, controller 130 updates the global nearest neighbor (GNN) tracker with a cost matrix set by picking the closest Mahalanobis distance, with a threshold of 2 standard deviations.

Object 3 has significant Radial error (distance along radial direction of camera→object) of 20 m but this is typical for a CNN system and so creates a Mahalanobis distance of 1.0 (1 std dev) which is less than the threshold of 2 and so object 3 is assigned to Track 1.

Object 4 has significant azimuth (distance across radial direction of camera→object) error of 17 m and this is exceptional for a CNN system and so creates a Mahalanobis distance >4.0 (4 std devs) which is more than the threshold of 2 and since this is the smallest Mahalanobis distance, object 4 is unassigned and a tentative track is initiated and called Track 3.

The tracking provided by controller 130 differentiates over current tracking implementation in that AIS updates have a large interval (30 s or longer) and high accuracy including not only position but also velocity; charted marks have high accuracy and known zero velocity; CNN classification is broad: unknown, vessel, mark, surface water sport, MOB/swimmer, Bridge, Land, Wildlife, etc.; classes are directly matched as mark→charted-mark, vessel→AIS and their velocities are initialized (or reset) directly; and objects which are not paired with either charted marks or AIS targets, become tracked objects with unknown type.

Figure 23:
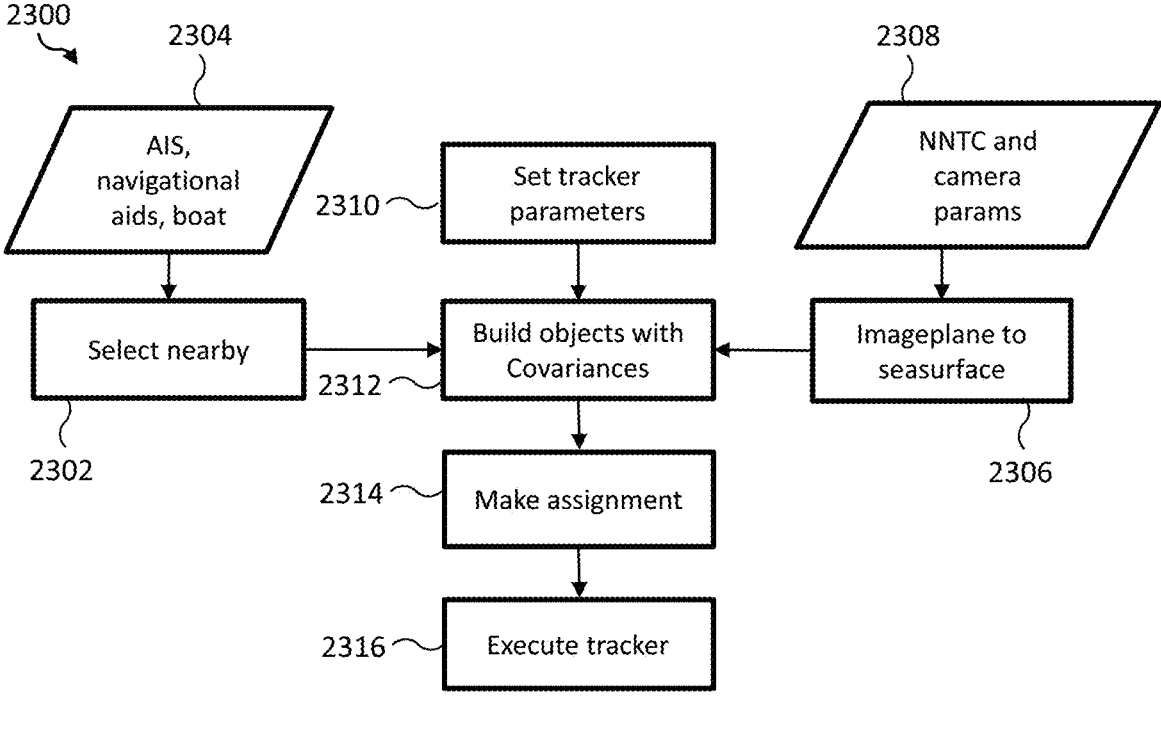
FIG. 23 illustrates a flow diagram of a process for sensor fusion associated with a mobile structure implemented with an assisted navigation system in accordance with an embodiment of the disclosure.

FIG. 23 illustrates a flow diagram of a process 2300 for sensor fusion associated with mobile structure 101 implemented with assisted navigation system 100 in accordance with an embodiment of the disclosure. In block 2302, controller 130 selects nearby objects from a database of AIS targets and Navigational marks 2304 and transforms the object to the latitude/longitude/cartesian (LLC) coordinate system. In block 2306, controller 130 converts radar detections and CNN 2308 from the sensor coordinate system to a mobile structure 101 centered sea-surface reference plane, then to the LLC coordinate system. In block 2310, controller 130 sets tracker parameters and then, in block 2312, controller 130 builds objects with covariances. Controller 130 does this based on the sensor characteristics (e.g., range uncertainty is high for CNN where pixels-below-horizon has poor geometry for range estimation particularly if cameras are mounted low down). Thus, controller 130 determines the covariance matrix for each object in LLC coordinates. In block 2314, controller 130 makes assignments using the covariances. Controller 130 determines the Mahalanobis distance from each tracked target to each observation, picking the most likely match between object and target based on the class match and lowest Mahalanobis distance (applying a minimum number of standard deviations for a match to be obtainable). In block 2316, controller 130 executes the tracker.

In some embodiments, any of the various sensor fusion techniques may be used to issue alarms and/or instructions to a pilot regarding potential collisions. For example, in some embodiments, marine collision regulations may be applied to the output of one or more sensor fusion processes such that the pilot may receive instructions (e.g., advice) regarding how to avoid potential collisions or dangerous situations (e.g., "turn 10° to starboard" or "slow down"). In some embodiments, such instructions may be provided to an autopilot system (e.g., implemented by system 100) to adjust a heading of the mobile structure 101 in accordance with the instructions. In some embodiments, CNN classification techniques may be used to adjust the instructions and/or the operations of the autopilot depending on various factors (e.g., whether a boat is sailing, present tack of the boat, relative ability of different vessels to stop or turn quickly such as sailboats in comparison to tankers in close proximity to each other).

In some embodiments, information (e.g. data) provided by any of the various sensor fusion techniques may be stored and/or further processed for future reference. For example, such information may be provided to various entities (e.g., insurance companies, government agencies, and/or other parties) for insurance and/or regulatory purposes (e.g., to evaluate pilot safety and/or compliance with marine collision regulations).

Regarding sensor autocalibration, controller 130 performs sensor autocalibration for and between each sensor on mobile structure 101. For example, regarding one or more onboard cameras, an angle subtended between an object and the horizon (horizontal direction) is ø and the camera is mounted a known height h from the water surface, then the distance estimate is h/tan(ø). It is apparent that as ø becomes small, the range becomes large and hence sensitivity to the accuracy in ø becomes very significant. Error in h is caused by measurement difficulties or installation error/drift, error in ø may be caused by error in p (targets contact pixel with the water to horizon pixel) and camera intrinsic parameters (VFOV, Vpixel count, lens distortion) which convert p to ø. Error in azimuth may be caused by camera mounting setup error/drift, and by intrinsic parameter uncertainty (HFOV, Hpixel count and lens distortion).

All these errors may be reduced through calibration which is automated. The camera is initially uncalibrated and the tracker does not try to do fine grain matching of objects to targets. Instead, controller 130 goes from the known to the unknown, matching only simple cases, for example a single mark and a single CNN detection of class mark which are matchable within installation tolerance (+/−10° of camera tilt, elevation, and azimuth). It is possible to match multiple objects per frame so long as they have good azimuth separation (elevation separation is not possible due to the arctan sensitivity). Each match is logged in a grid so controller 130 has an image-plane record matched to a real-world record. The real world may be restricted to marks or can include marks and AIS updates. For best accuracy, controller 130 does not add difficult cases to the record, for example being within 50 meters of a mark is acceptable if the mark is fixed in the ground (its position is accurately known) but for floating marks we need to be further away to minimize angle errors. Similarly, for vessels, class A (large) vessels may be used but require greater distances since their GPS receivers have unknown offsets from the center of their CNN boxes. Some inaccuracy may be tolerated.

Figure 24:
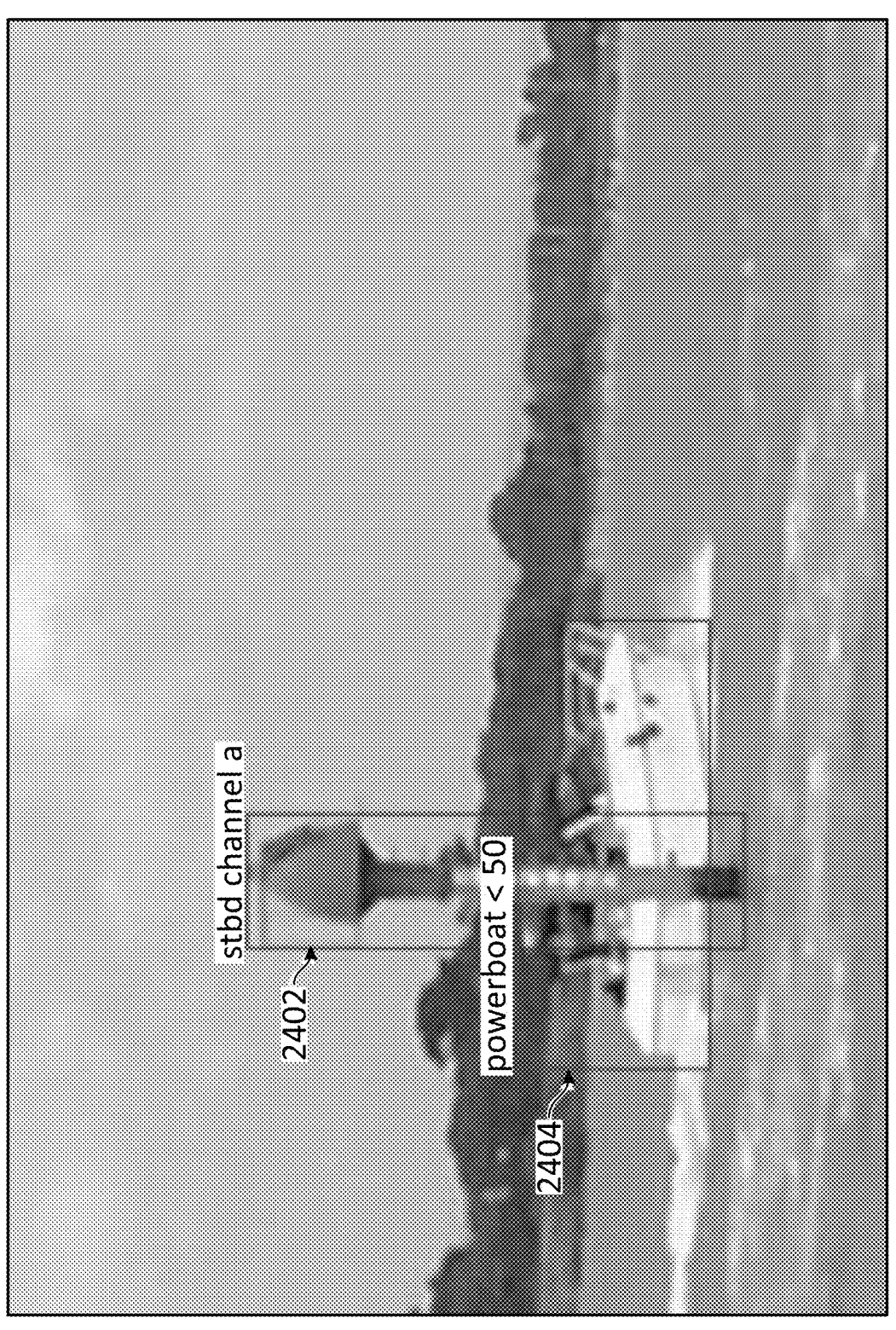
FIG. 24 illustrates, detecting a mark using CNN, matching the mark with its known context-dependent navigational chart position, and correcting the azimuth uncertainty of a small powerboat which is right behind the mark in accordance with an embodiment of the disclosure.

This system relies on CNN detection and classification, since marks from the navigational chart can be cross referenced to CNN mark classes and vessels' AIS signatures can be cross referenced to CNN vessel classification. The main aim of CNN is to detect objects that cannot be detected using other sensors (e.g., small powerboats, surface watersports). However, controller 130 train the CNN to also detect the objects that are available from other sensors (like marks which are available in the navigational chart, big powerboats in AIS) as their positions may be used to minimize the detection/tracking error of objects that may only detected by the CNN. For example, FIG. 24 illustrates, detecting a mark 2402 using CNN, matching mark 2402 with its known navigational chart position and correcting the azimuth uncertainty of small powerboat 2404 which is right behind mark 2402 in accordance with an embodiment of the disclosure.

Figure 25:
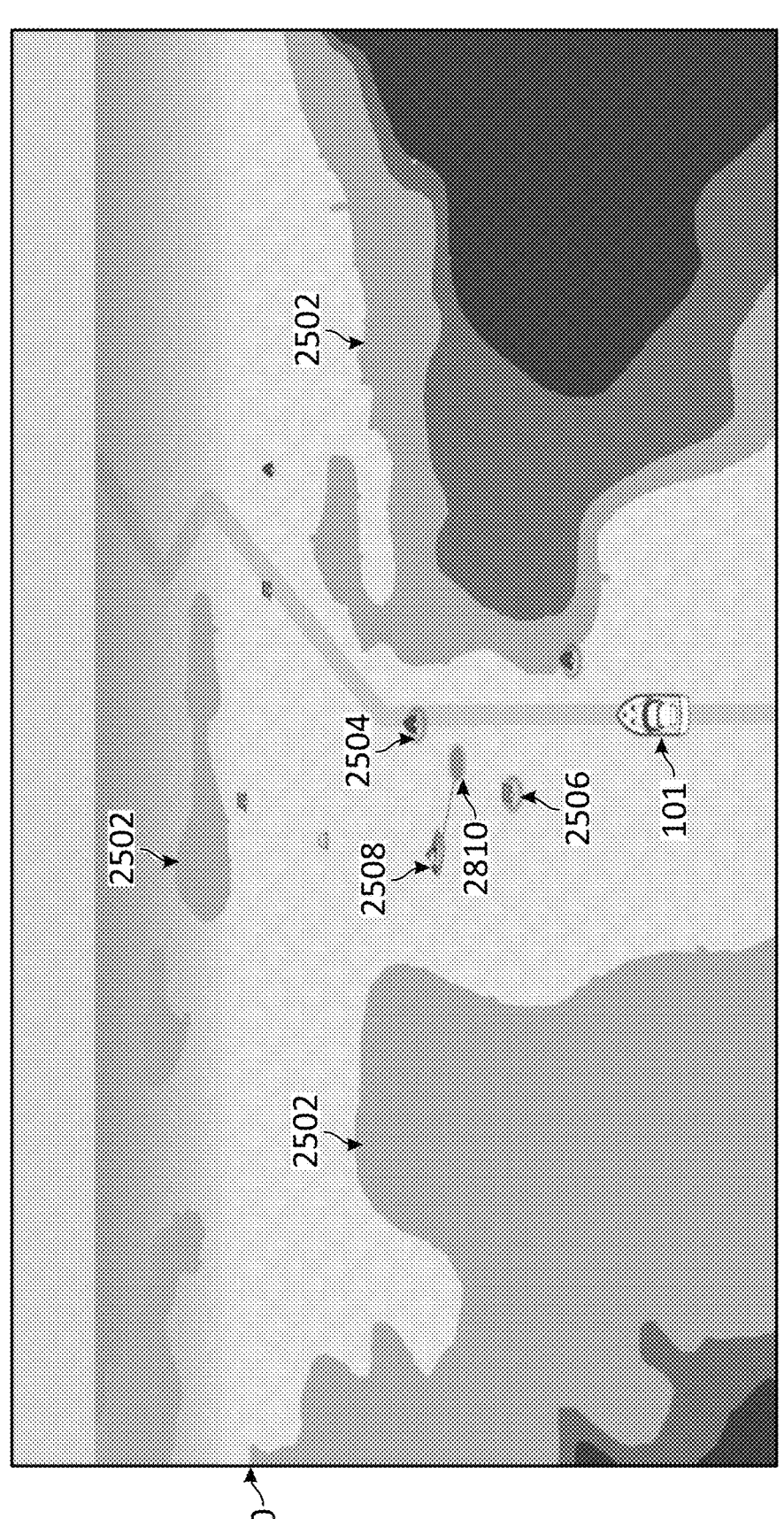
FIG. 25 illustrates an exemplary navigational display for a mobile structure implemented with an assisted navigation system in accordance with an embodiment of the disclosure.

Regarding navigational chart decluttering, controller 130 simplifies a navigational display so that a zone of a particular color identifies a "no-go" zone, which may be reflected across shallow water, other vessels, lobster pots, etc. FIG. 25 illustrates an exemplary navigational display 2500 for mobile structure 101 implemented with assisted navigation system 100 in accordance with an embodiment of the disclosure. Navigational zone 2500 depicts object based on information known about the objects. For example, in navigational display 2500, zones 2502 are known shallow depth regions, objects in the water, or navigational advice and are thus considered "no-go" zones. Navigational display 2500 further illustrates other objects based on their known or identifiable information, such as static navigational hazardous objects 2504 identified as possible threats the navigation of mobile structure 101 as well as static navigational non-hazardous objects 2506 identified as objects that do not pose a possible threat to the navigation of mobile structure 101. Additionally, navigational display 2500 illustrates moving objects of interest 2508 based on its AIS information and associated heading that is identified as possible threat the navigation of mobile structure 101 as shown by threat circle 2510.

Figure 26:
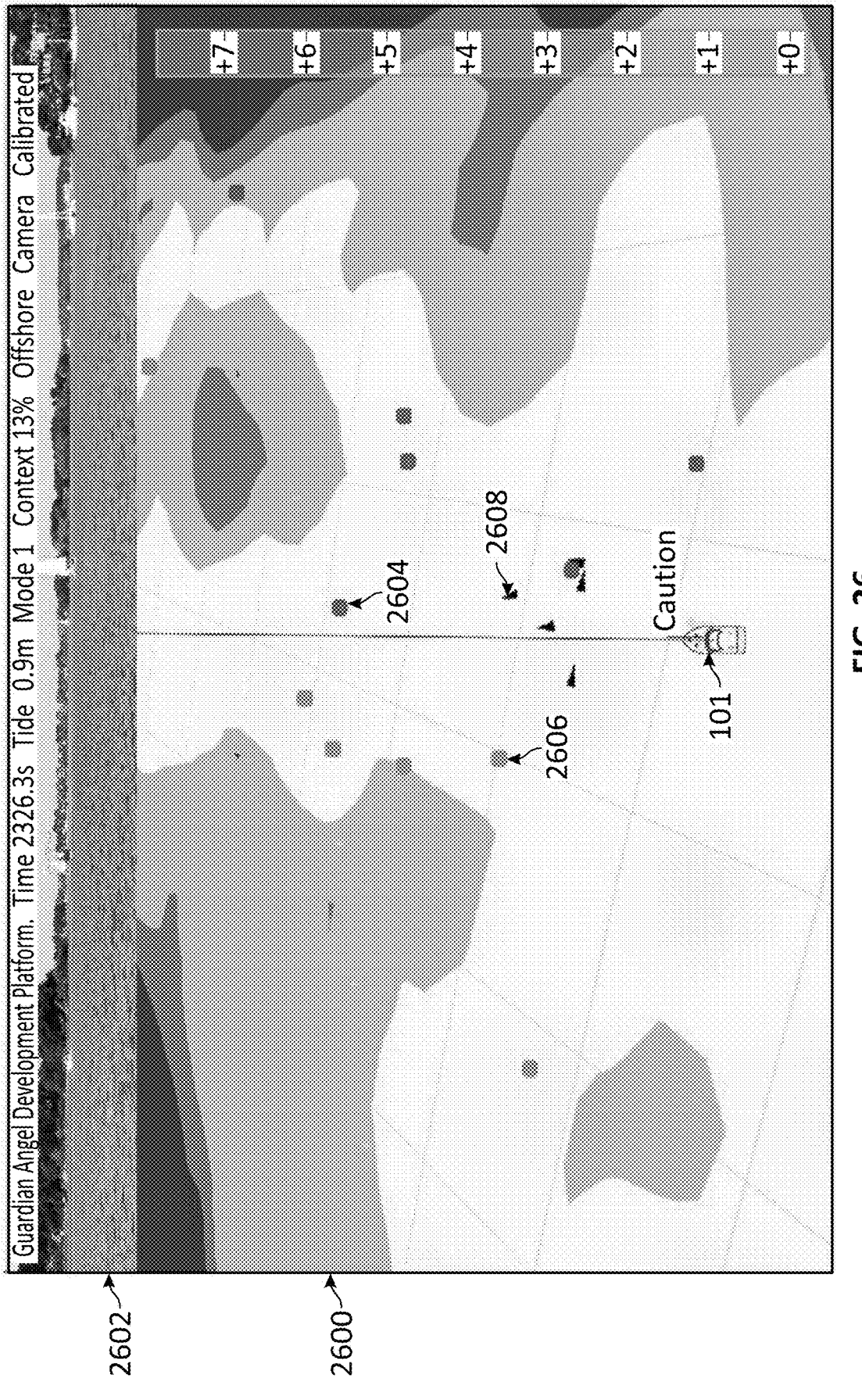
FIG. 26 illustrates an exemplary navigational display for a mobile structure implemented with an assisted navigation system in accordance with an embodiment of the disclosure.

Integration of a camera view with this simplified navigational display 2500 of FIG. 25 helps to remove the disconnect skippers usually suffer with north-up and head-up orientations and connecting navigational chart-based hazards to real-world hazards. Therefore, FIG. 26 illustrates an exemplary navigational display 2600 for mobile structure 101 implemented with assisted navigation system 100 in accordance with an embodiment of the disclosure. Navigational zone 2600 also depicts object based on information known about the objects. Navigation display 2600 is shown mapped to the camera view 2602 of the pilot of mobile structure 101 such that the island (center right) maps perfectly between both views, as do the headlands left and right. Controller 130 provides this matching through manual choice of navigational chart clip area and projection ratio. Navigational display 2600 further illustrates static navigational hazardous objects 2604 identified as possible threats the navigation of mobile structure 101 as well as static navigational non-hazardous objects 2606 identified as objects that do not pose a possible threat to the navigation of mobile structure 101. Additionally, navigational display 2600 illustrates moving objects of interest 2508 that may or may not be navigational threats bases on whether vessels 2508 are stationary or moving and, if moving, their individual headings. Due to the high level of sensitivity of camera calibration, it may be desirable to do a pre calibration sea trial where distant objects are recorded by the neural network, since this will create a horizon line.

Figure 27:
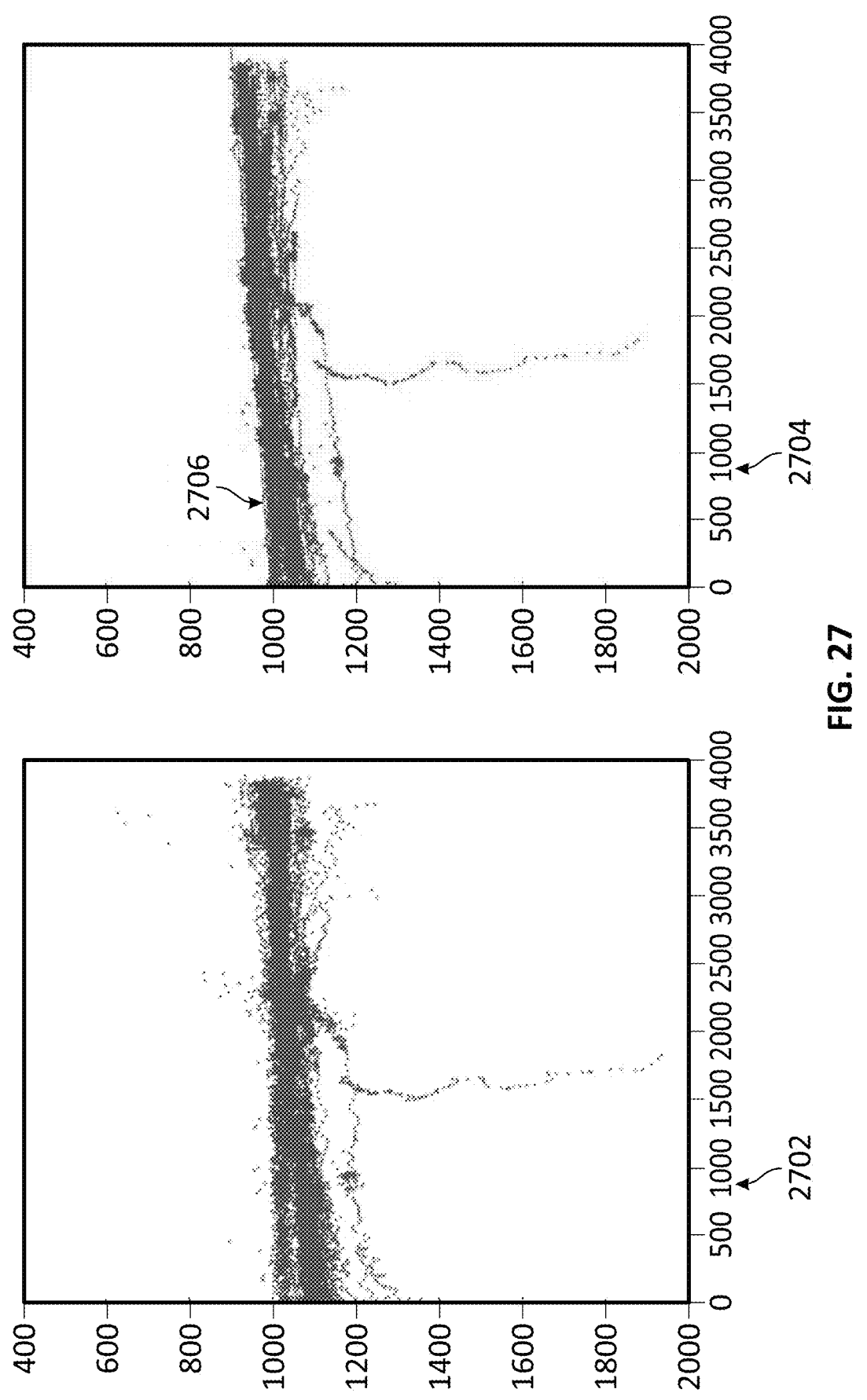
FIG. 27 illustrates an exemplary calibration of a camera used as a sensor for a mobile structure implemented with an assisted navigation system in accordance with an embodiment of the disclosure.

FIG. 27 illustrates an exemplary calibration of a camera used as a sensor for mobile structure 101 implemented with assisted navigation system 100 in accordance with an embodiment of the disclosure. View 2702 depicts a raw xy image plane locations of CNN classifier output boxes (center bottom of box) and view 2704 depicts positions corrected for the boat's roll and pitch. The precalibration is then the slope or line 2706 (camera tilt) and the position of the center of the red line vs the camera principal point as the reference which represents infinite distance on the sea surface. During operation, controller 130 may perform ongoing range calibration as described above but also by looking at the velocity of targets versus the velocity implied by their range and the mobile structure 101 yaw rate. Since velocity=range*yaw_rate, controller 130 deduces that range=velocity/yaw_rate, so a fixed target like a mark, or a moving target with known velocity like a recently updated AIS target may be used to predict target range if mobile structure 101 has some yaw rate. From a set of ranges, controller 130 fine-tuned the camera pitch/roll calibration using a similar technique to that detailed above.

Figure 28:
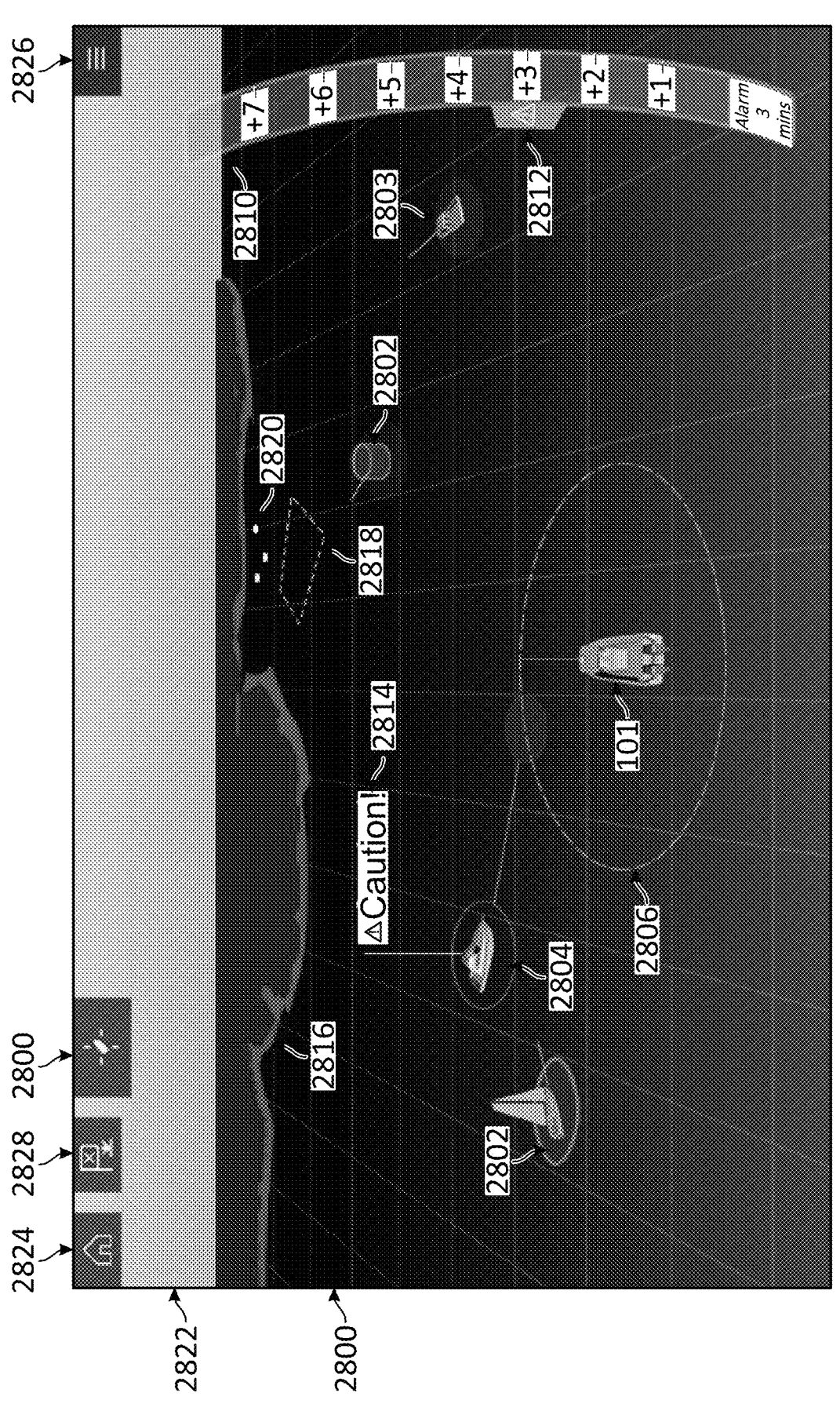
FIG. 28 illustrates an exemplary decluttered display view for a mobile structure implemented with an assisted navigation system in accordance with an embodiment of the disclosure.

FIG. 28 illustrates an exemplary decluttered navigational chart 2800 for mobile structure 101 implemented with assisted navigation system 100 in accordance with an embodiment of the disclosure. In some embodiments, the decluttering provided by assisted navigation system 100 is "smart" because the decluttering may not be uniform across the view for all objects. That is, while "no-go" depths might be uniform, assisted navigation system 100 displays other objects in decluttered navigational chart 2800 based on the position, COG, and route of the mobile structure 101; direction of a camera mounted on the mobile structure 101, etc. Therefore, decluttered navigational chart 2800 is associated with a course and/or a planned route for the mobile structure 101 and displays data of relevance and threats, with in-context alerting. That is, decluttered navigational chart 2800 identifies moving radar target 2802 moving AIS vessel 2803 as objects that do not pose a possible threat to the navigation of mobile structure 101 based on their headings, speed, etc. Additionally, navigational display 2800 identifies moving objects of interest 2804 identified as possible threats the navigation of mobile structure 101. Based on the heading of mobile structure 101 and the course of moving object of interest 2804, i.e., the heading, speed, COG, etc., of the of moving object of interest 2804 indicates that moving object of interest 2804 will enter the threat area 2806 of mobile structure in three minutes. The time before mobile structure 101 will encounter moving object of interest 2804 may be shown on navigational hazard threat timeline 2808. As illustrated, navigational hazard threat timeline 2808 provides a time to threat area 2810 associated with moving object of interest 2804 as well as an alarm area 2812 indicating a "Caution" which is also displayed as "Caution!" indicator 2814 associated with the vessel, i.e., moving object of interest 2804, causing the alarm. In some embodiment, the amount of time before assisted navigation system 100 issues an alarm may be adjusted by the pilot so that, for example, novice pilots may have extra warning given, be made aware of high clearance requirements, etc. Further, navigational display 2800 identifies objects such as shallows 2816, low relevance area 2818, low relevance objects 2820, etc., which may pose future threats to mobile structure 101 is the current heading is maintained. Still further, navigational display 2800 provides a header 2822, that includes selection icons including but not limited to home 2824, menu 2826, controls 2828, or navigational icon 2830 associated with the currently display navigational display 2800.

Controller 130 merges multiple sensor information is merged and, after automatic calibration, utilizes the information for georeferencing. Controller 130 interpolates tide height so that shallow waters may be detected. Controller 130 identifies collision warnings as operational context-dependent since proximity mid-water is perceived differently to inshore. Thus, using all available sensor information, controller 130 detects dangerous situations and provides visual and/or audible alarms with ample warning. Decluttered display view 2700 is designed to avoid overwhelming a pilot of a mobile structure 101 with data, drawing the pilot's attention to relevant information and, if an alarm occurs, identifying a dangerous condition.

FIG. 29 illustrates a flow diagram of a process 2900 to provide assisted navigation for mobile structure 101 implemented with assisted navigation system 100 in accordance with an embodiment of the disclosure. More generally, process 2900 may be used to provide general navigational control for mobile structure 101. It should be appreciated that any step, sub-step, sub-process, or block of process 2900 may be performed in an order or arrangement different from the embodiments illustrated by FIG. 29. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 2800 is described with reference to systems, processes, control loops, and images described about FIGS. 1A-28, process 2900 may be performed by other systems different from those systems, processes, control loops, and images and including a different selection of electronic devices, sensors, assemblies, mobile structures, and/or mobile structure attributes, for example.

In block 2902, controller 130 receives data from a plurality of sensors associated with a mobile structure 101. For example, controller 130 may receive data from one or more of orientation sensor 140, gyroscope/accelerometer 144, GNSS 146, perimeter ranging system 148, and/or a combination of those, and/or other sensor data or control signals provided by other elements of system 100 of mobile structure 101.

In block 2904, controller 130 determines a plurality of navigational hazards disposed within a monitored area associated with the mobile structure 101. The monitoring area indicating an area that changes based on speed, heading, position, traffic, etc. The navigational hazards may be pre-determined data pulled from a database, such as database 195, or real-time data identified by other sensors and/or actuators, e.g., perimeter ranging system 148a and 148b, steering sensor/actuator 150, sensor cluster 160 (e.g., orientation sensor 140, gyroscope/accelerometer 144, and/or GNSS 146), etc. The navigation hazards may include but are not limited to tide height/keel depths, collision decluttering, operational context, collision detection, smart alerting, sensor fusion, sensor auto calibration, and navigational chart decluttering. For example, controller 130 may be configured to determine tide height/keel depth for mobile structure 101. For example, using tidal data from a set of tide stations that provides tidal heights and flows and sounding data from a set of sounding stations that provides latitude and longitude sets of points with associated depths, controller 130 uses the distances to a closest number, e.g., three, tide stations and detected land barriers to determine the shortest seaward route to each tidal height station. Controller 130 estimates flow speeds along route, i.e., along each route, and then estimates the current using the nearest charted flow while taking land barriers into account. Controller 130 then weights the tidal heights by distance and flow thereby creating a weighted mean of the closest number of tide heights where the weight depends not just on the distance (closest has highest weighting) but also flow speed, so that fast flow (e.g., tidal race) has the effect of reducing the weight and thereby determining tide height/keel depth for mobile structure 101.

In some embodiments, controller 130 may be configured to perform collision decluttering for mobile structure 101. For example, controller 130 receives positions and targets information associated with a plurality of vessels and times to closest point of approach (TCPAs) for each of the plurality of vessels. For each vessel in the plurality of vessels, controller 130 locates a vessel at its current position on the multifunction display. In some embodiments, for each vessel in the plurality of vessels, controller 130 multiplies the vessel's speed over ground (SOG) by the vessel's TCPA to identify the distance from the mobile structure 101. In other embodiments, controller 130 multiplies the vessel's SOG by the vessel's time to impact (Ti) (e.g., in cases where the vessel turns to provoke a collision while maintaining its current speed). Controller 130 uses the determined distance to add a collision zone along the course over ground (COG). Then controller 130 adds cautionary identifiers indicating urgency, such as highlighted color codes. That is, to control clutter, controller 130 prioritizes which vessels to highlight using a concept of urgency, where a degree of urgency affects the highlighting, i.e., only urgent targets are high-lighted.

In some embodiments, controller 130 may be configured to provide operational context mapping for mobile structure 101. For example, controller 130 receives sounding data that provides latitude and longitude sets of points with associated depths and navigational aids that identify mark points and types of marks. Controller 130 determines a Searoom by establishing distances in meters from each latitude and longitude to the nearest constraint i.e., non-navigable sounding or nearest constraining mark (e.g., port/starboard/cardi-nal/danger but not special marks). Controller 130 converts the Searoom to a grid by interpolation to form a Searoom 'heatmap' based on a latitude and longitude evenly spaced grid. Controller 130 converts the determined grid to opera-tional context by converting the Searoom in meters to operational context on a scale from 0-1. Therefore, control-ler 130 creates separate Searoom grids for navigational aids and soundings, then fuses the grids together.

In some embodiments, controller 130 may be configured for detecting possible collisions associated with mobile structure 101. For example, controller 130 utilizes mobile structure data about mobile structure 101 from step 2802, i.e., boat position, velocity, etc. from onboard GPS, and identifies vessel data regarding positions and velocities of vessels coming from data fusion of AIS, radar, navigational charts, etc. Marks having zero velocity are also target vessels. Controller 130 determines relative positions and velocities by subtracting a vector of mobile structure 101 from each of the relative positions and velocities of the target vessels. Controller 130 determines TCPA and CPA vectors, each relative velocity is projected in time to achieve time to closest point of approach and closest point of approach vectors. Controller 130 obtains assisted navigation system parameters, i.e., obtains the inflation in meters from an operational context map and urgency in seconds for each target from target types and velocities. Controller 130 deter-mines clearance requirement dependent on orientation and direction of travel based on the obtained parameters and determines the clearance based on the determined relative positions and velocities as well as the determined TCPA and CPA vectors. Controller 130 determines the ratio of the actual clearance to the clearance requirement. Controller 130 applies temporal filtering to all outputs.

In some embodiments, controller 130 may be configured to reduce a false alarm rate for mobile structure 101 through smart alerting. For example, controller 130 only produces an alarm in situations identified as urgent and risky. Controller 130 generates an alarm when clearance margin is, for example, less than 1 and the urgency is identified as immi-nent. For example, controller 130 considers that the clear-ance margin is, for example, less than 1 and the urgency is identified as imminent as persistent for 10% of the relevant imminent classification time. Controller 130 considers any alarm cancelation by the pilot as semi-permanent, i.e., there should be no time windows after which alarms are reacti-vated. However, if an alarm has been cancelled by the pilot of mobile structure 101 (e.g., due to shallow depth or shallows ahead), controller 130 reactivates the alarm auto-matically when the depth exceeds a predetermined threshold again using a hysteresis window.

In some embodiments, controller 130 is configured for sensor fusion associated with mobile structure 101. For example, controller 130 selects nearby objects from a data-base of AIS targets and Navigational marks and transforms the object to the LLC coordinate system. Controller 130 converts radar detections and CNN classifications from the sensor coordinate system to a mobile structure 101 centered sea-surface reference plane, then to the LLC coordinate system. Controller 130 sets tracker parameters and then builds objects with covariances. Controller 130 does this based on the sensor characteristics (e.g., range uncertainty is high for CNN where pixels-below-horizon has poor geom-etry for range estimation particularly if cameras are mounted low down). Thus, controller 130 determines the covariance matrix for each object in LLC coordinates. Controller 130 makes assignments using the covariances. Controller 130 determines the Mahalanobis distance from each tracked target to each observation, picking the most likely match between object and target based on the class match and lowest Mahalanobis distance (applying a minimum number of standard deviations for a match to be obtainable). Con-troller 130 then executes the tracker.

In other embodiments, controller 130 is configured to perform sensor autocalibration for and between each sensor on mobile structure 101. In yet other embodiments, control-ler 130 simplifies a navigational display so that a zone of a particular color identifies a "no-go" zone, which may be reflected across shallow water, other vessels, lobster pots, etc.

In block 2906, controller 130 processes the data and/or the navigational hazards to determine an operational context of the mobile structure 101. For example, to determine an operational context, controller 130 considers safe clearance for objects such as other marine vessels (e.g., passing 1 nautical mile (NM) ahead of a tanker in the English Channel is dangerous, whereas 50 meters is a normal passing distance in the River Hamble) and characteristics of mobile structure 101 (e.g., vessel speed, Automatic Identification System (AIS) class, convolutional neural network (CNN) classification, etc.). In some embodiments, block 2906 may further include processing the type of watercraft to determine the operational context.

In block 2908, controller 130 generates a context-dependent navigational chart for the mobile structure 101. Controller 130 generates the context-dependent navigational chart such that the context-dependent navigational chart comprises greater or fewer of the navigational hazards in response to the determined operational context. For example, the context-dependent navigational chart displays data of relevance and threats, based on the operational context of mobile structure 101. The context-dependent navigational chart is designed to avoid overwhelming a pilot of a mobile structure 101 with data, drawing the pilot's attention to relevant information and, if an alarm occurs, identifying a dangerous condition. In block 2910, controller 130 updates the context-dependent navigational chart in response to changes in the data.

Additional embodiments are also contemplated. For example, although particular data and navigational hazards have been discussed for purposes of generating context-dependent navigational charts, a large variety of information may be used such as soundings, navigation marks, activity in the local area (e.g., using automatic identification system (AIS) information), crew tiredness, size of a vessel, sea state, tidal state (e.g., low tide can cause vessels to concentrate more) and/or other information.

Any of the techniques discussed herein may be applied to the current path (e.g., current heading and speed) of mobile structure 101 and/or a predicted route (e.g., future headings and speeds including accounting for turns at waypoints and/or other expected navigational adjustments).

In some embodiments, waypoints may be displayed on navigational charts in a context-dependent manner. For example, waypoints may be displayed with larger representations at higher speeds (e.g., a large circle or other representation) and smaller representations at lower speeds (e.g., a small circle or other representation). In this regard, the larger representation at higher speeds may be useful to provide more warning to a pilot (e.g., skipper) as the waypoint approaches, whereas the smaller representation may be appropriate when in proximity to land or other navigational restrictions at lower speeds and/or when navigation must be performed in a more precise manner.

Although operational context has been discussed in relation to navigational charts, other applications are also contemplated. For example, in some embodiments, various aspects or settings of system 100 may be adjusted as appropriate in response to operational context such as, for example, radar modes, sonar settings, pilot response, and/or other features.

In some embodiments, system 100 may be implemented with automatic radar plotting aid (ARPA) capability to identify radar-based targets for use in generating navigational charts. However, in the context of marine based navigation of mobile structure 101, land based targets and/or targets in non-navigable water that are identified by ARPA techniques may not be relevant. Accordingly, in some embodiments, such targets may be excluded and/or identified (e.g., by red color or otherwise) to provide improved context-dependent navigational charts.

In some embodiments, the manner in which various features are presented in navigational charts may depend on their relevance. For example, in some embodiments, distant objects or irrelevant objects may be shown with reduced size or detail (e.g., shown as dots), not shown at all, and/or otherwise represented in contrast to with closer objects that may be shown with increased size and/or detail. As a result, navigational charts may be decluttered in a manner that provides the most helpful information to the pilot.

In some embodiments, navigational charts may provide current and/or future representations of various navigational hazards and/or other features relative to mobile structure 101. For example, navigational charts may be presented based on a current position and speed of mobile structure 101 and/or a projected future position and speed of mobile structure 101 (e.g., assuming mobile structure 101 maintains the same course and speed and/or follows a predetermined route at a current or expected speed). In some embodiments, navigational charts may be presented with one or more user controls (e.g., a physical or graphical slider) that permits a pilot to selectively adjust between the current position and various future positions and therefore identify potential future navigational hazards and/or other conditions that may be encountered in the future. In some embodiments, various popup animations and/or other representations of such information may be used as appropriate.

In some embodiments, navigational charts may be presented with additional information as appropriate to assist a pilot. For example, graphical alerts (e.g., colors, popup graphics, and/or PAD zone designations), audible alerts (e.g., spoken warnings and/or alarms), and/or other alerts may be provided in response to speed restrictions, speed warnings, collision warnings, shallows warnings, unsafe water (e.g., firing zones) and/or other conditions.

In some embodiments, targets (e.g., physical features) may be presented as three dimensional models on navigational charts. For example, sensor fusion techniques and/or CNN techniques may be used to identify (e.g., classify) targets that are represented by a corresponding three dimensional model. For example, if a target is identified as a boat, a three dimensional model of a boat may be provided on a navigational chart (e.g., in contrast to a generic symbol or object such as a cylinder that may be conventionally used to represent radar detected targets).

In some embodiments, navigational charts may be presented in an augmented reality view with various graphics, three dimensional models, and/or other representations provided as markups on augmented reality images captured and/or processed by one or more cameras of perimeter ranging system 148a. In some embodiments, such cameras may be implemented in an array to provide a surround view of mobile structure 101. As a result, the augmented reality view may be panned, rotated, and/or otherwise adjusted to permit a pilot to view navigational hazards, targets, and/or other features in a plurality of directions in relation to mobile structure 101 (e.g., to view possible inbound dangers approaching from any direction).

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method comprising:
receiving data by a logic device from a plurality of sensors associated with a mobile structure;
determining, by the logic device, a plurality of navigational hazards disposed within a monitored area associated with the mobile structure;
processing, by the logic device, the data and/or the navigational hazards to determine, for each point of a plurality of points in the monitored area:
a distance from the point to each of one or more navigational constraints for the mobile structure; and
the smallest distance of the distances from the point to the one or more constraints, the smallest distance being encoded into an operational context of the mobile structure;
generating, by the logic device, a context-dependent navigational chart for the mobile structure, wherein the navigational chart comprises greater or fewer of the navigational hazards in response to the determined smallest distances;
updating the navigational chart by the logic device in response to changes in the data; and
steering the mobile structure by a navigation control system in accordance with the updated navigational chart.

2. The method of claim 1, wherein:
the plurality of points comprises the plurality of the navigational hazards; and
the data comprises a speed, a heading, and/or a position of the mobile structure, wherein the mobile structure is a type of watercraft.

3. The method of claim 1, further comprising selectively generating an alarm associated with at least one of the navigational hazards in response to the operational context.

4. The method of claim 1, wherein the navigational hazards comprise tide heights associated with locations in the monitored area, wherein the processing comprises assigning weights to the tide heights and a distance between the mobile structure and the locations, wherein the generating comprises selectively providing the tide heights on the navigational chart in response to the weights.

5. The method of claim 2, wherein the navigational hazards comprise objects in the monitored area, wherein the processing comprises determining intercept times from the mobile structure to the objects and determining distances from each of the objects to one or more of the other objects, wherein the generating comprises selectively providing the objects on the navigational chart in response to the intercept times.

6. The method of claim 1, wherein the data comprises sounding data, wherein the processing comprises generating a Searoom map using the sounding data and adjusting the operational context using the Searoom map.

7. The method of claim 5, wherein the processing comprises assigning intercept time thresholds to types of navigational hazards, wherein the generating comprises selectively providing the navigational hazards on the navigational chart in response to their associated intercept time thresholds.

8. The method of claim 1, wherein the processing comprises determining clearance margins associated with the navigational hazards, wherein the generating comprises adjusting representations of the navigational hazards on the navigational chart in response to the clearance margins.

9. The method of claim 7, wherein the data comprises data associated with a target received from the plurality of sensors, wherein the processing comprises fusing the data to provide a single representation of the target used to determine the operational context;
wherein the method further comprises defining a plurality of urgency levels, and defining the intercept time thresholds separately for each of the plurality of urgency levels;
wherein the generating comprises selectively providing the navigational hazards on the navigational chart in response to their associated intercept time thresholds for a selected one of the urgency levels.

10. The method of claim 1, wherein the generating comprises representing the navigational hazards by a color-coded representation of at least a portion of the monitored area on the navigational chart.

11. A system comprising:
a user interface device providing a display, wherein the user interface device is associated with a mobile structure; and
a logic device configured to communicate with the user interface device and a plurality of sensors associated with the mobile structure, wherein the logic device is configured to:
receive data from the sensors,
determine a plurality of navigational hazards disposed within a monitored area associated with the mobile structure,
process the data and/or the navigational hazards to determine, for each point of a plurality of points in the monitored area:
a distance from the point to each of one or more navigational constraints for the mobile structure; and
the smallest distance of the distances from the point to the one or more constraints, the smallest distance being encoded into an operational context of the mobile structure,
generate a context-dependent navigational chart for the mobile structure, wherein the navigational chart comprises greater or fewer of the navigational hazards in response to the determined smallest distances,
update the navigational chart in response to changes in the data, and
cause a navigation control system to steer the mobile structure in accordance with the updated navigational chart.

12. The system of claim 11, wherein:
the plurality of points comprises the plurality of the navigational hazards; and
the data comprises a speed, a heading, and/or a position of the mobile structure, wherein the mobile structure is a type of watercraft.

13. The system of claim 11, wherein the logic device is configured to selectively generate an alarm associated with at least one of the navigational hazards in response to the operational context.

14. The system of claim 11, wherein the navigational hazards comprise tide heights associated with locations in the monitored area, wherein the logic device is configured to assign weights to the tide heights and a distance between the mobile structure and the locations, wherein the logic device is configured to selectively provide the tide heights on the navigational chart in response to the weights.

15. The system of claim 12, wherein the navigational hazards comprise objects in the monitored area, wherein the logic device is configured to determine intercept times from the mobile structure to the objects and determine distances from each of the objects to one or more of the other objects, wherein the logic device is configured to selectively provide the objects on the navigational chart in response to the intercept times.

16. The system of claim 11, wherein the data comprises sounding data, wherein the logic device is configured to generate a Searoom map using the sounding data and adjust the operational context using the Searoom map.

17. The system of claim 15, wherein the logic device is configured to assign intercept time thresholds to types of navigational hazards, wherein the logic device is configured to selectively provide the navigational hazards on the navigational chart in response to their associated intercept time thresholds.

18. The system of claim 11, wherein the logic device is configured to determine clearance margins associated with the navigational hazards, wherein the logic device is configured to adjust representations of the navigational hazards on the navigational chart in response to the clearance margins.

19. The system of claim 17, wherein the data comprises data associated with a target received from the plurality of sensors, wherein the logic device is configured to fuse the data to provide a single representation of the target used to determine the operational context;

wherein the logic device is configured to define a plurality of urgency levels, and define the intercept time thresholds separately for each of the plurality of urgency levels;

wherein the generating comprises selectively providing the navigational hazards on the navigational chart in response to their associated intercept time thresholds for a selected one of the urgency levels.

20. The system of claim 11, wherein the logic device is configured to represent the navigational hazards by a color-coded representation of at least a portion of the monitored area on the navigational chart.

* * * * *